(12) United States Patent
Johnson

(10) Patent No.: US 11,260,694 B2
(45) Date of Patent: Mar. 1, 2022

(54) SEGMENTED INNER TUBE

(71) Applicant: Eidon, LLC, Mercer Island, WA (US)

(72) Inventor: Roger N. Johnson, Mercer Island, WA (US)

(73) Assignee: Eidon, LLC, Mercer Island, WA (US)

( * ) Notice: Subject to any disclaimer, the term of this patent is extended or adjusted under 35 U.S.C. 154(b) by 27 days.

(21) Appl. No.: 15/442,484

(22) Filed: Feb. 24, 2017

(65) Prior Publication Data

US 2017/0246907 A1  Aug. 31, 2017

Related U.S. Application Data

(60) Provisional application No. 62/300,283, filed on Feb. 26, 2016.

(51) Int. Cl.
| | | |
|---|---|---|
| *B60C 5/04* | (2006.01) | |
| *B60C 5/20* | (2006.01) | |
| *B60C 5/24* | (2006.01) | |
| *B60C 5/10* | (2006.01) | |

(52) U.S. Cl.
CPC .................. *B60C 5/04* (2013.01); *B60C 5/10* (2013.01); *B60C 5/20* (2013.01); *B60C 5/24* (2013.01); *B60C 2200/12* (2013.01)

(58) Field of Classification Search
CPC .. B60C 5/02; B60C 5/025; B60C 5/04; B60C 5/08; B60C 5/10; B60C 5/20
See application file for complete search history.

(56) References Cited

U.S. PATENT DOCUMENTS

| | | | |
|---|---|---|---|
| 1,832,017 | A | 11/1931 | Giorchino |
| 2,196,814 | A | 4/1940 | Mcclay |
| 2,203,124 | A | 6/1940 | Barry |
| 2008/0257470 | A1 | 10/2008 | Biesse |
| 2014/0116199 | A1 | 5/2014 | Rogozinski et al. |

FOREIGN PATENT DOCUMENTS

| | | | |
|---|---|---|---|
| CN | 1526576 A | | 9/2004 |
| CN | 201272206 | * | 7/2009 |
| CN | 202669395 | * | 1/2013 |
| CN | 103223823 A | | 7/2013 |
| DE | 513831 C | | 12/1930 |
| DE | 617131 C | | 2/1936 |

(Continued)

OTHER PUBLICATIONS

Receipt of ISR-WO dated May 8, 2017 for application No. PCT/US2017/019442.

(Continued)

*Primary Examiner* — Justin R Fischer
(74) *Attorney, Agent, or Firm* — Makor Law Group, PLLC; Ronald Stern

(57) ABSTRACT

An inner tube comprising a unitary tube segmented into a plurality of chambers, the plurality of chambers interconnected therebetween. A plurality of interconnections may be respectively configured between the plurality of chambers wherein the plurality of interconnections may be operable to control airflow between adjacent ones of the plurality of chambers. A valve coupled to the unitary tube, the valve operable to allow introduction of air into the plurality of chambers through the plurality of interconnections.

21 Claims, 17 Drawing Sheets

(56) References Cited

FOREIGN PATENT DOCUMENTS

| | | | |
|---|---|---|---|
| DE | 686224 C | | 1/1940 |
| FR | 728366 | * | 7/1932 |
| FR | 769220 | * | 8/1934 |
| FR | 1005870 | * | 4/1952 |
| GB | 173550 | * | 12/1921 |
| WO | WO 2010/15544 | * | 8/2010 |

OTHER PUBLICATIONS

Anhalt, Tom, "What's in a tire?", Slowtwitch.com (Aug. 10, 2009), http://www.slowtwitch.com/Tech/What_s_in_a_tire_955.html. Retrieved on Feb. 24, 2017.

Anhalt, Tom, "What's in a tube?", Slowtwitch.com (Sep. 21, 2009), http://www.slowtwitch.com/Tech/What_s_in_a_tube_1034.html. Retrieved on Feb. 24, 2017.

Brown, et al., "Bicycle Tires and Tubes", Harris Cyclery, http://www.sheldonbrown.com/tires.html, Published 1997, Retrieved Feb. 24, 2017.

Kopecky, Greg, "All About Tubeless", Slowtwitch.com (May 28, 2012), http://www.slowtwitch.com/Tech/All_About_Tubeless_2799.html. Retrieved on Feb. 24, 2017.

Kopecky, Greg, "Fast Tires 2013", Slowtwitch.com (Jul. 25, 2013), http://www.slowtwitch.com/Products/Things_that_Roll/Tires/Fast_Tires_2013_3787.html. Retrieved on Feb. 24, 2017.

Kopecky, Greg, "Fast Tires for 2012-1", Slowtwitch.com (Apr. 9, 2012), http://www.slowtwitch.com/Products/Things_that_Roll/Tires/Fast_Tires_for_2012_-_1_2684.html. Retrieved on Feb. 24, 2017.

Kopecky, Greg, "Fast Tires for 2012-2". Slowtwitch.com (Apr. 11, 2012), http://www.slowtwitch.com/Products/Things_that_Roll/Tires/Fast_Tires_for_2012_-_2_2686.html. Retrieved on Feb. 24, 2017.

Kopecky, Greg, "Fast Tires for 2012-3". Slowtwitch.com (Apr. 30, 2012), http://www.slowtwitch.com/Products/Things_that_Roll/Tires/Fast_Tires_for_2012_-_3_2727.html. Retrieved on Feb. 24, 2017.

Taralon, E. et al., Certified English translation of FR 769220 A, "Pneumatic tire with a device for reducing the effects of punctures and preventing bursting," Aug. 22, 1934, p. all.

Extended European Search Report dated Jul. 15, 2019 for EP Application No. 17757342.5, 17 pages.

Examination Report for EP 17757342.5 dated May 13, 2020, 8 pages.

Office Action for EP 17757342.5 dated Dec. 17, 2020, 10 pages.

* cited by examiner

US 11,260,694 B2

SEGMENTED INNER TUBE

CROSS-REFERENCE TO RELATED APPLICATION(S)

This application claims the benefit under 35 U.S.C. § 119 of the earlier filing date of U.S. Provisional Application Ser. No. 62/300,283, filed Feb. 26, 2016, the entire contents of which is hereby incorporated by reference in its entirety for any purpose.

SUMMARY

According to one aspect, an inner tube comprising a unitary tube segmented into a plurality of chambers, the plurality of chambers interconnected therebetween; a plurality of interconnections respectively configured between the plurality of chambers, the plurality of interconnections operable to control airflow between adjacent ones of the plurality of chambers; and a valve coupled to the unitary tube, the valve operable to allow introduction of air into the plurality of chambers through the plurality of interconnections.

According to another aspect, a tire assembly, comprising a segmented inner tube assembly, wherein the segmented inner tube assembly includes: a plurality of bladders configured to be pneumatically inflated, a plurality of interconnections respectively positioned between the plurality of bladders, the plurality of interconnections operable to occlude pneumatic flow between adjacent ones of the plurality of bladders in response to a substantial increase in the pneumatic flow between the adjacent ones of the plurality of bladders, and a single valve configured to allow pneumatic inflation of the plurality of bladders through the plurality of interconnections; a tire carcass having beads along its edges, the tire carcass configured to enclose the segmented inner tube assembly; and a rim having flanges wherein the beads interlock with the flanges to secure the tire carcass to the rim.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION

Figure 1A:
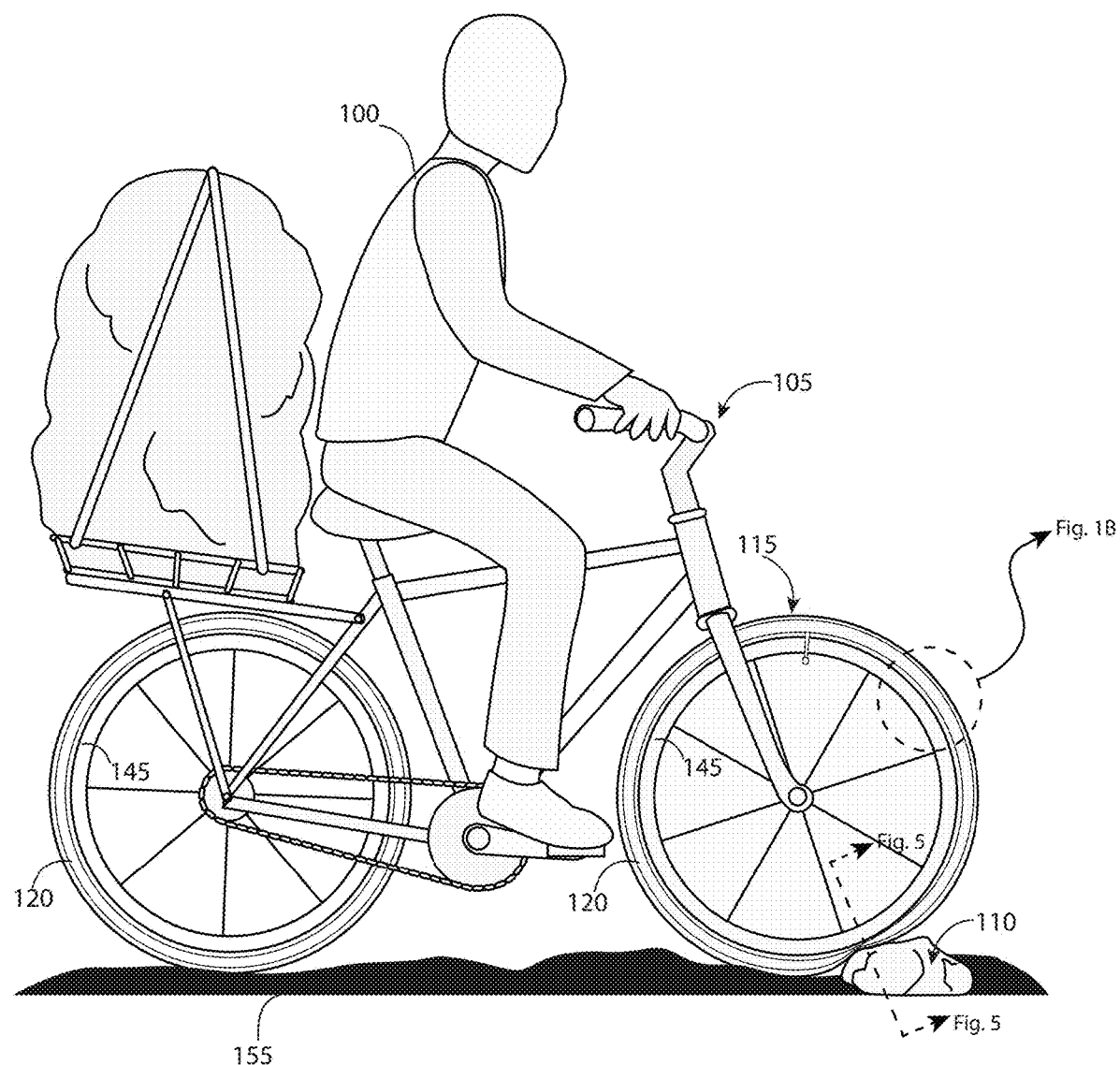
FIG. 1A is a schematic illustration of a bicycle rider operating a bicycle while traversing over an impediment where the bicycle comprises a prior art bike tire configuration having a standard inner tube, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Tires are commonly inflated with pressurized air to improve ride comfort and reduce rolling resistance while maintaining required traction. During a large impact the inflated tire can allow the tire to collapse into the rim and cause a tube rupture. This occurs despite the larger force generated under the enlarged contact area. Air pressures are often lowered in order to increase traction with the reduction of the safety margin reserved for flat avoidance.

Pneumatic tires hold their air against time and leaks in order to provide ride benefit. In the simplest form, a tire is made to withstand inflation pressure and to provide a friction and wear tread to the area of contact with the ground. Inside the tire carcass may be a rubber bladder or tube designed to hold the air pressure for a long time without leaking. The rubber or latex of the tube cannot withstand great pressure without the carcass and is not strong relative to perforations or punctures. Punctures occur when a sharp object is able to perforate or when the tire is compressed far enough to pinch the tube against the rim, as mentioned above. This pressure ruptures the rubber in the contact area, often with the rim of the wheel, like a lip is split. They often occur in pairs as the impact exceeds the resistance pressure of the tire's pressure against the ground and the edges of the two rims are driven against the inside tube.

It is desirable to ramp up the resistance of the tire against the impact object, such as a curb. Normally the intrusion of the curb increases the area of contact with the tire, resulting in more force exerted against the curb. For example, a contact patch from a 50 psi tire and a 200 lb. person is 4 square inches. Hitting a curb might double the area before rim to tube contact is made at which time the pressure in the tire is pressing back against the rim with an extra 200 lbs. of force. This provides a sufficient increased pressure response to prevent pinch flats in most circumstances. A very small increase in tire pressure occurs due to the very small decrease in the internal volume of the tire. A higher speed hit, a heavier rider, and lower tire pressure can eliminate the compression safety margin after which rim contact through the tube will cause a leak.

As will be discussed herein, it would be beneficial to have a tube design able to provide a much higher temporary pressure in the immediate area of impact. Consider the arrangement of many (e.g., 50) individual inflated bladders/balls with that of a single inflated tube during a tire and curb hit. Initially the balls/bladders and tire are at the same pressure. During the hit, a conventional tube is deformed by the curb where this deformation reduces the total tire volume by a small amount. However, in the tire filled with individual balls/bladders, the bladder at the hit location is severely compressed as the deformation attempts to compress the bladder entirely. Once the bladder's volume is reduced to ½, the pressure is double; and when it is reduced to ⅕, the pressure is increased 5×. The local response to a hit of increasing pressure quickly provides for greatly increased pinch flat reduction. In addition, the increase provides extra protection against rim strikes and wheel damage.

There are several products on the market that are directed to making the tire useable following a puncture. Most of these use multiple bladders so that un-punctured bladders are able to provide functional use of the tire. There are many multi bladder designs going back to the early 1900's that provide varying means to survive partial punctures. There is even a company now that sells TIREBALLS. These individual bladders have to be individually pumped up and in some cases require unmounting the tire to inflate. By definition, these bladders need to be isolated when filled, which increases the complexity of filling them.

As will be described herein, a single bladder may be segmented into sequenced smaller cavities. The air passageway between each cavity is large enough for reasonable filling times yet small enough during an impact event to limit air loss to an insignificant level. As a result, the air pressure in the compressed bladder/cell can spike to the very high levels able to prevent rim strikes and thus pinch flats. Unlike multi-bladder designs on the market today, a single puncture will deflate the immediate bladder/cavity immediately and the remaining segments as fast as air can move between cavities. This segmented single bladder design may allow for a tube to be inflated in the normal manner (and in some embodiments, a bit slower) from a single port and yet provide the benefit of local pressure spiking during impacts.

The rate of airflow between cavities may be controlled through several ways. For example, the passageway between cavities can be designed to pass air freely as long as the pressure difference between cavities is small. But during a hit that attempts to displace air quickly, the passage way can be cut off almost entirely. It will be understood to those of ordinary skill in the art that embodiments may include many different segmented bladder configurations able to smooth the rolling of the tire, to change its inflated shape and to provide variable cushioning during use.

The embodiments described herein include interconnected bladders that accommodate filling from a single valve and a means to limit the fast flow of air between cavities. These embodiments provide a progressive response to impacts by employing a segmented inner tube that limits air flow rates between segments. As a result, each segment resisting an abrupt intrusion will increase both contact area and air pressure. For example, air pressure may more than double during an impact, thereby eliminating a rim strike and the tube damage that often occurs. The segments may be connected with passages that allow inflation air to reach all the segments. Air added to the tube from a pump through a standard valve may, for example, be supplied at a rate that does not cause significant pressure differences among any of the segments. This segmented tube may replace standard tubes. The segmented tube may be inflated in the normal fashion and yet be run at much lower pressures without increasing the damage risk.

Pneumatic Considerations

Wheeled vehicles are often fitted with tires that support weight on a cushion of pressurized air. This air is contained within an impermeable membrane that stretches to fill the space constrained by the tire. It is pressurized to a level that the tire is able to withstand that is also high enough to support the weight by pressing in the useable flattened contact area. During impacts, such as striking a curb, the temporary impact on the tire exceeds the total force generated by the initial patch area and increases the patch area until the additional force of the larger area can counter the intrusion. Some impacts collapse the tube completely despite the increased force generated by the larger flattened area and the curb hits the rim. This can pinch the tube against the rim causing a rupture and even damage to the rim. This common failure is exacerbated by low initial tube pressures. In some situations low tube pressures are intentionally lowered to increase tire traction, which is correlated to increased contact area. The safety margin against pinch flats is significantly lowered with low tube pressures.

Progressive Response

One solution to maintaining safety margins while increasing traction is a progressive pressure response to increasing impact intrusions. Such a tube would provide a normal ride over conventional surfaces but ramp up the response pressure for intrusions into the tube space. In other words, the tube would operate on normal pressures for normal surfaces, but would present a localized higher pressure in an area of increasing contact area.

One such tube and tire combination available in the market combines a high pressure inner tire surrounded by a low pressure tubeless tire. Impacts that surpass the ability of the tubeless setup then impact the inner high pressure tire. This design provides a staged response to the hit and is commercially described as a dual core.

A better design, which will be described herein in more detail, would increase the pressure in the local area in step with the advancing intrusion. This requires multiple isolated segments since pneumatic pressures normalize over the entire tube cavity quickly. These segments should be small enough to experience significant volume change caused by the intrusion and yet large enough to span across the intrusion's shape. Air flow between these segments may be very low for high volume transfers but allowed at the lower rates used for filling the tube. The allowance for low rate transfer between tubes provides for a conventional filling valve in one segment to fill all the segments in the tube.

It is not uncommon for a tube during impact to have the contact area double, which doubles the reaction force. The pressure change in a tire during a hit is less than 5% due to the small reduction of volume relative to the whole tube. Segmenting the tube into isolated sections allows for local pressure increase to more than double during the same impact intrusion as the volume change is relative to the smaller bladder. Such a tube allows a tire to roll normally over smooth surfaces but resist sudden intrusions with much larger reaction forces. As a result the tube avoids rim hits that cause ruptures and lower running tube pressures can be used.

Example Embodiments of Various Designs

Bladder Shape

The progressive nature of each segment depends primarily on the size and shape of the bladder and the performance of the passageway between bladders. The shape can range from a few large segments that look like link sausages to numerous ones that can be or are like thin discs or even small tori. Each bladder can react to intrusion by collapsing in shape and volume reduction. Some designs may, for example, compound the pressure increase through shape changes that serve to multiply the volume reduction.

Tire Profiles

The tire profile may be created by expansive pressure of the tube pressing the tire into the maximum curvature allowed. As a result the cross sections are nearly circular, except for the effect of the rigid treads and the wheel rim opening that grips the tire bead. In vertical loading the tire flattens and bulges to the sides increasing the grip on the beads. During cornering the wheel leans and the rim tends to ride over the tread which lifts the tread edge off the ground and leverages the outside bead away from the groove. Modifying the tube such that its inflated shape is non circular provides a means to maintain tread contact with the ground during cornering and to help keep the tread seated.

For example, a tube profile of multiple side-by-side inflated fingers may create a low profile shape that increases tire traction, resists the roll over and removes most of the leverage that unseats the bead. This composite profile may, for example, be built up from individual bladders that are essentially circular in cross section. Modification of the way the interconnections respond to impacts can provide tailored responses to specific types of impacts.

Interconnection

The isolation of each bladder may be accomplished by way of the interconnections between them. One embodiment of interconnections may comprise tube passages that are substantially small and severely limit large airflows in a small time window, while allowing large enough airflow to allow reasonable filling time. Alternative embodiments of interconnections may have the size of passage ways of the interconnections vary with flow rate. Such embodiments may provide a mild increase in reactive force for small hits and a very large one for severe hits. An extreme version of this would allow flow between bladders of similar pressures but become blocked if the pressure difference between adjacent bladders is large. In some cases the airflow can be made to flow in a one-way fashion. For example, a curb hit could intrude on a bladder with one-way connections that initially had such low rate flow that pressures would spike until a minimum pressure change in the passageway was met and excess air was allowed to flow into the next bladder effectively pre-charging it. In this manner, an excessive impact would increase the resistance of the next to be impacted location on the tire. In addition, such an action would serve to temporarily increase the radius of the tire helping it to ride over bumps and gaps.

Pneumatic Support

This pneumatic support provides a comfortable ride and reduces rolling resistance. Large differences in road surface are rolled over and evened out by the shock absorbing system of the vehicle. Small road irregularities are best absorbed at the tire level and provide a means to pass the irregularity without forcing the tire to move vertically. The air cushion is often contained in an impermeable tube that has little strength of its own. The pressure is contained by the nonexpanding tire carcass and is large enough to support the weight. In order to do so, according to one embodiment, a portion of the tire may be flattened and directly opposed by the non-restrained patch of the tire. These forces balance and enable, for example, a 50 psi tire to support 200 lbs with 4 sq inches of tire contact patch with a surface.

During an impact where much more force may be countered by the tire, the tire patch may grow to increase the patch area and resulting force. Very little change in tire volume occurs. The progressive response of multiple independent acting bladders provides a large volume reduction that increases pressures dramatically, often to more than double. This effect is progressive as the pressure increases proportionately with more severe impacts. As a result, the greater the impact the greater the resisting force. This requires very large impacts if the tube is to be pinched against the rim as each additional penetration ramps up the pneumatic response.

In addition to bladders that segment a long tube into small sections resembling sausages, the bladder shapes can be modified to tailor a specific pneumatic response. Layering a large bladder on top of a smaller one will provide a soft early response and much stiffer heavy response. Multiple bladders may also provide a strategy of adding protection in locations vulnerable to pinch flats or to bead separation from the rim. The bladders in these areas could be designed to first increase pressures or to enter the highest pressure levels.

Finally, should a puncture occur, it is possible to seal off the damaged bladder under defined circumstances. One event would be pressures dropping below a lower limit that causes the connecting lumens from the tube to seal on both sides. Note that the design already provides for slow filling of all bladders by a common lumen. These passageways can be designed to seal shut while under high flow conditions presented by a large leak. Other designs may use flow direction into the bladder section from each side as inputs to valves that seal the bladder at both sides when both flows are inward. The tube could maintain limited functionality in this fashion, even allowing the remaining bladders to be filled by the remaining pathways.

Figure 1B:
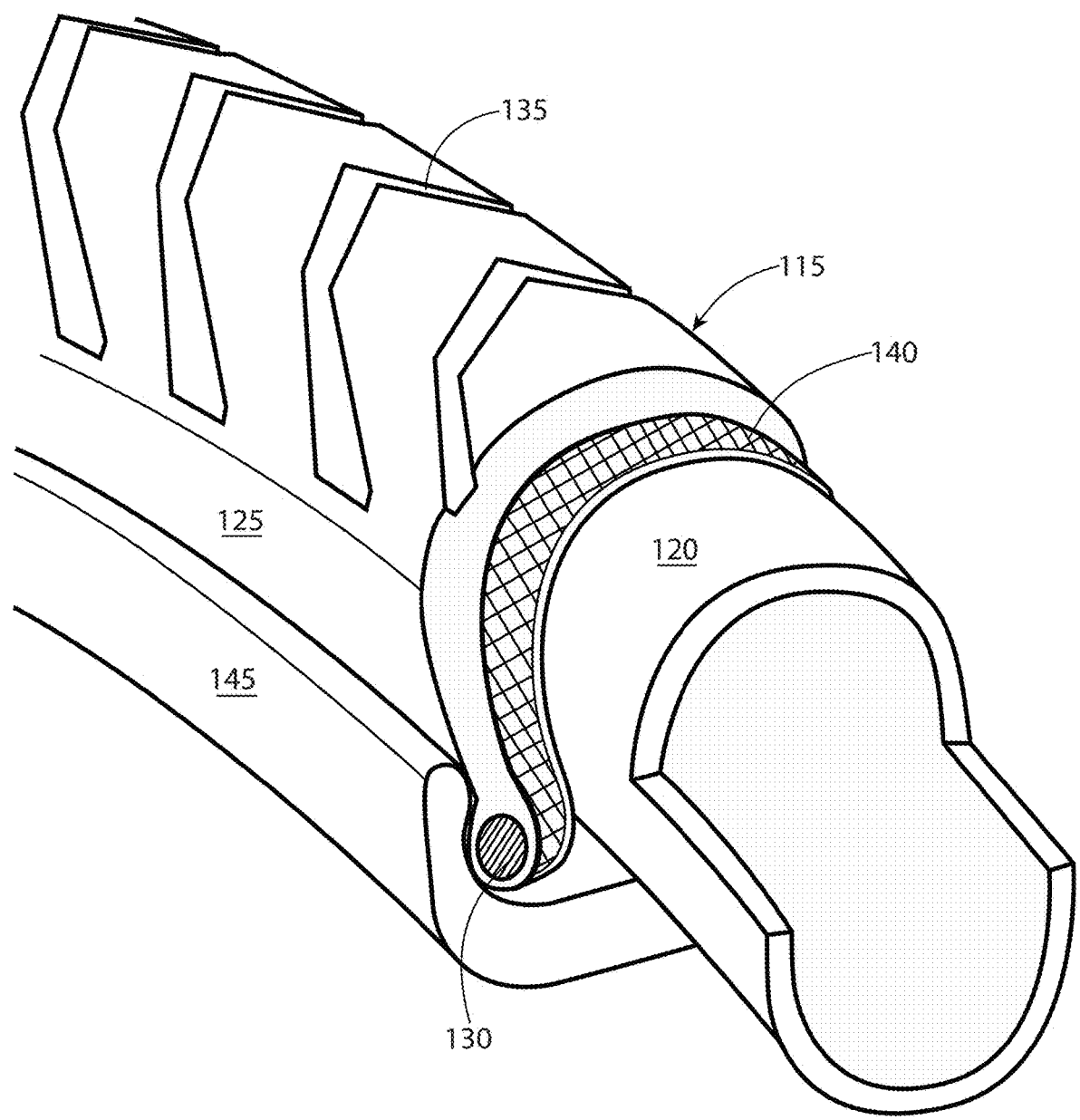
FIG. 1B is a 3D partial broken view of a portion of the prior art bicycle tire, according to one embodiment.

FIG. 1A shows a schematic illustration of a bicycle rider 100 operating a bicycle 105 while traversing over an impediment 110 where the bicycle 105 comprises a conventional bike tire 115 configuration having a standard inner tube 120, according to one embodiment. FIG. 1B shows a 3D partial exploded view of a portion of the conventional bicycle tire 115, according to one embodiment.

The bicycle 105 may comprise any type of bicycle known in the art. For example, the bicycle 105 may be electric, mechanical, hybrid electric, motor vehicle, or the like. The bike tire 115 is a standard conventional tire that may take the form of a clincher tire or tubular tire configuration. In particular, the bike tire 115 includes: a tires carcass 125 or carcass having beads 130 on the edge of the carcass 125 that fit within a rim 145, a tread 135, and the inner tube 120.

The tire carcass 125 ("carcass") may comprise a layer of various types of fibers, such as for example nylon, cotton, or silk. The carcass 125 is configured to provide sufficient resistance against expansion to maintain the internal air pressure while remaining flexible to conform to the ground surface. It will be appreciated by those skilled in the art, the thread count of the carcass fibers influence the weight and performance of the tire carcass 125.

Instead of being interwoven, the fiber or fabric threads may be arranged in parallel rows to form a fabric layer 140. The fabric layer 140 may be encased in a matrix of rubber, thereby forming the tire carcass 125. The fibers of the carcass 125 may, for example, be unwoven and kept in separate plies so that they can move more freely to reduce wear and rolling resistance. In one embodiment, the fibers may be oriented diagonally to form bias plies. A layer of this fiber material is often referred to as a "ply" and in some embodiments, the carcass 125 may include at least two sheets of fiber layers or plies arranged such that fiber strands in each ply are at an angle to the other (also known as "bias plies"). In another embodiment of the tire 115, a KEVLAR® belt may run under the tread layer 135, in addition to the fabric layers 140 or bias plies. This is to help prevent punctures through the carcass 125.

A thickness of the fabric layer 140 determines flexibility, and thus how much energy is absorbed at the contact patch 160. The contact patch 160 refers to a portion of the tire carcass 125 that is flattened against the ground surface 155 or the impediment 110. Fabric layer thickness embedded within the tire carcass 125 may be designated by TPI (Threads Per Inch). The thinner the individual threads that are used to create the fabric, the more threads there are per inch when measured across them. The higher the TPI number, the thinner and more flexible the tire fabric is. As such, high TPI tires (or thin wall tires) are both lighter in weight and have lower rolling resistance than low TPI tires (thick wall tires). However, high TPI tires are more easily damaged by road hazards such as the impediment 110 illustrated in FIGS. 1A and 2A. On the other hand, the thicker the fabric material 140 in the carcass 125 (low TPI), the more difficult it is to deform and the more energy it takes to flex it a given amount. This means that more energy will be lost during the contact patch 160 deformation through rolling resistance or "rolling friction."

The fabric layer 140 may be woven between the beads 130 to give the tire 115 its basic shape and then coated with rubber material. Each of the tire carcass 125 beads 130 may comprise a steel wire or KEVLAR® fiber bead that interlocks with flanges 150 in the rim 145. The inner tube 120 may be enclosed by the rim 145 to support the tire carcass 125 and maintain the interlocking of the beads 130 with the flanges 150 in the rim 145.

The tread 135 of the tire 115 is the rubber interface that serves as a contact between the tire carcass 125 and a surface 155 (e.g., cement, asphalt, dirt, gravel, or the like). The tread 135 may, for example, be relied upon to provide adequate friction with the road surface 155 so that cornering forces could be transmitted to it. It may be advantageous for the tread 135 rubber compound to have high friction properties, while not absorbing much energy when flexed at the contact patch 160. Absorbing energy at the contact patch 160 results in an increased rolling resistance. In one embodiment, additives such as carbon black or silica may be added to the rubber to improve wear and friction properties of the rubber. The addition of silica to rubber as a filler material may be advantageous because it causes the tire carcass 125 to have lower internal energy loss from flexing at the contact point, thereby improving the rolling resistance. However, silica has a drawback in that it causes poorer frictional performance in wet conditions than rubber compounds with carbon black.

The geometric properties of the tread 135 may also influence energy loss at the contact patch 160. Similarly to the fabric layer 140, thickness of the tread 135 may determine the flexing capability of the carcass 125 at the contact patch 160 and thereby the rolling resistance magnitude. Although a thicker tread 135 material may last longer and not wear out as easy, it may not have as low of a rolling resistance as a thinner tread 135 of the same material.

The inner tube 120 illustrated in FIGS. 1A-1B may take the form of a unitary bladder having a doughnut shape and a single air valve used for inflation, where the single air valve is embedded within the inner tube 120. The inner tube 120 is typically embedded within the bicycle tire 115 to contain the air pressure. The air pressure inside the inner tube 120 serves as an "air spring" that has some advantageous properties for use in pneumatic tires. The air spring aspect of the inner tube 120 has a nearly perfectly linear force vs. deflection curve (for the typical deflections found in the contact patch 160) and has extremely low (i.e. nearly non-existent) energy losses. These properties give the pneumatic tire an advantage over solid tire materials since it allows the tire to act as an effective suspension for the bicycle.

The inner tube 120 may comprise butyl ("polyisobutylene") rubber or latex material. Butyl is a synthetic rubber and is advantageous in that its cost is relatively inexpensive, provides for low air diffusion over time, and is durable. However, butyl may be relatively inelastic and more susceptible to pinch flats. Because of the inelasticity feature of butyl rubber, its use tends to cause higher energy losses from flexing at the contact patch 160.

On the other hand, an advantage of latex material is its elasticity. More specifically, a latex inner tube 120 has a greater ability to be stretched or deflected by large amounts and then return to its unloaded state with very little energy loss. Because of this property, the use of latex tubes in a bicycle tire tends to give the combination of tire and tube a lower overall rolling resistance as compared to the same tire with a butyl tube. However, latex may be relatively expense (i.e., two to three times the cost of butyl) and may have a higher rate of air diffusion from the inner tube 120.

The tire 115 of FIGS. 1A-1B supports its load by leveraging the air pressure in the inner tube 120 which holds the fabric layer 140 of the tire carcass 125 under tension. Practically, the inner tube 120 holds the fabric layer 140 under tension in all areas of the tire carcass 125 except for the contact patch 160 with the ground. At the contact patch 160, the tire carcass 125 is flattened against the ground as the air pressure pushes downward in an attempt to counter the flattening of the carcass 125. The air pressure inside the inner tube 125 does not substantially change while a resistant force $R_F$ acting against the inner tube 125 equals the bicycle load. As such, the contact patch 160 area approximately equals the bicycle load divided by the air pressure within the inner tube 125. For example, in response to a 50 PSI inner tube supporting 100 lbs of resistant force $R_F$, there will be a 2 square inch area of carcass 125 or contact patch 160 touching the ground.

As a result of formation of the contact patch 160, a bulge may be seen at the bottom of the tire under the bicycle load. Depending on the ply of the tire (bias ply or radial ply), the bulge may appear lengthwise in both directions along the tire (bias ply), or along the sidewalls extending outward (radial-ply).

In response to a needle or other sharp object puncturing through the carcass 125 and the inner tube 120, the tire 115 goes flat because all the air of the inner tube 120 is allowed to escape. In some embodiments, multiple layers of treads 135 may be employed to reduce the risk of puncturing the inner tube 120. Alternatively and/or additionally, a tire sealant (e.g., SLIME THRU-CORE™) may be disposed along an inside of the tire tread 135 which may instantly seal punctures through the tread 135 area up to about ¼" thick. Of course, the tire sealant may be helpful as long as the puncture does not penetrate the inner tube 120.

As discussed above, the inner tube 120 holds the fabric layer 140 and the carcass 125 under tension in all areas except for the contact patch 160 with the ground. Even if the inner tube 120 contains sufficient air pressure therein, there occurs flattening of the tire carcass 125 at the contact patch 160 where the air pressure pushes downward in an attempt to counter the flattening effect. However, because the pressure within the inner tube 120 does not substantially change throughout the inner tube 120, this pressure is insufficient to counter the flattening caused by the resistant force $R_F$ of the bicycle load. As a result, the bicycle tire 115 bulges at the contact patch 160. This bulging at the contact surface is what causes the increased rolling resistance that the bicycle rider 100 compensates for during cycling.

Figure 5:
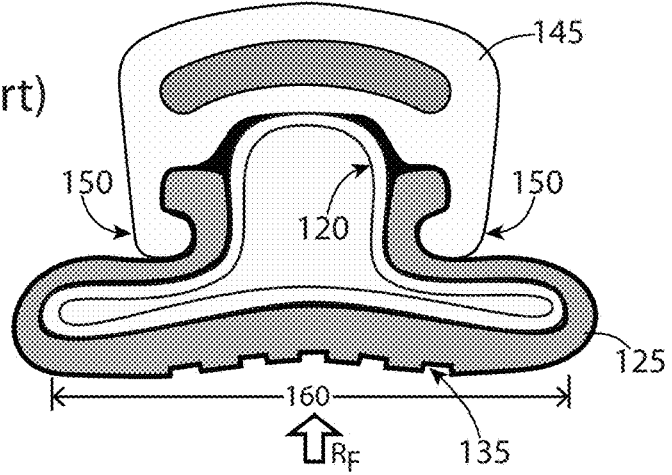
FIG. 5 is a 2D cross sectional illustration of a portion of the bike tire of FIG. 1A that is impacted by the impediment, according to one embodiment.

Reference is now made to FIG. 5 which is a 2D cross sectional schematic illustration of a portion of the bike tire 115 of FIG. 1A that is impacted by an impediment 110, according to one embodiment.

A damaging scenario may occur if the air pressure within the inner tube 120 is too low and/or the resistant force $R_F$ suddenly has a drastic increase. For example, the bicycle rider 100 may hit the impediment 110 (e.g., rock, hole, curb, uneven surface, etc.) or an extra load (e.g. additional rider jumps on, heavy bag added to the bicycle, etc.) may be added to the bicycle 105, which causes a sudden increase in resistant force $R_F$. As mentioned above, if inner tube pressure of 50 PSI is within the tire 115, then it takes a contact area of 2 square inches to support 100 lbs of resistant force $R_F$. Assuming, for example, the extra rider or impediment 110 impact causes the resistant force $R_F$ to increase to 300 lbs while the inner tube 120 has a 50 PSI air pressure, 6 square inches of contact area is needed to support such impact. Practically speaking, 6 square inches of contact surface would cause the tire 115 to flatten almost completely at the contact area and thereby pinch the inner tube 120 and tire carcass 125 between the solid rim 145 and ground. Consequently, a pinch flat scenario results. Even if a pinch flat does not occur immediately, such drastic flattening erodes the inner tube 120 and carcass 125 over time, which leads to the inevitable pinch flat or snakebites in the near future. As is understood to those of ordinary skill in the art, "snakebite" refers to double holes in the inner tube 120 caused by an impact of the compressed inner tube 120 against both edges of the rim 145. Because the double holes mimic a two-fang bite mark, such phenomenon is often referred to as "snakebite."

Figure 2A:
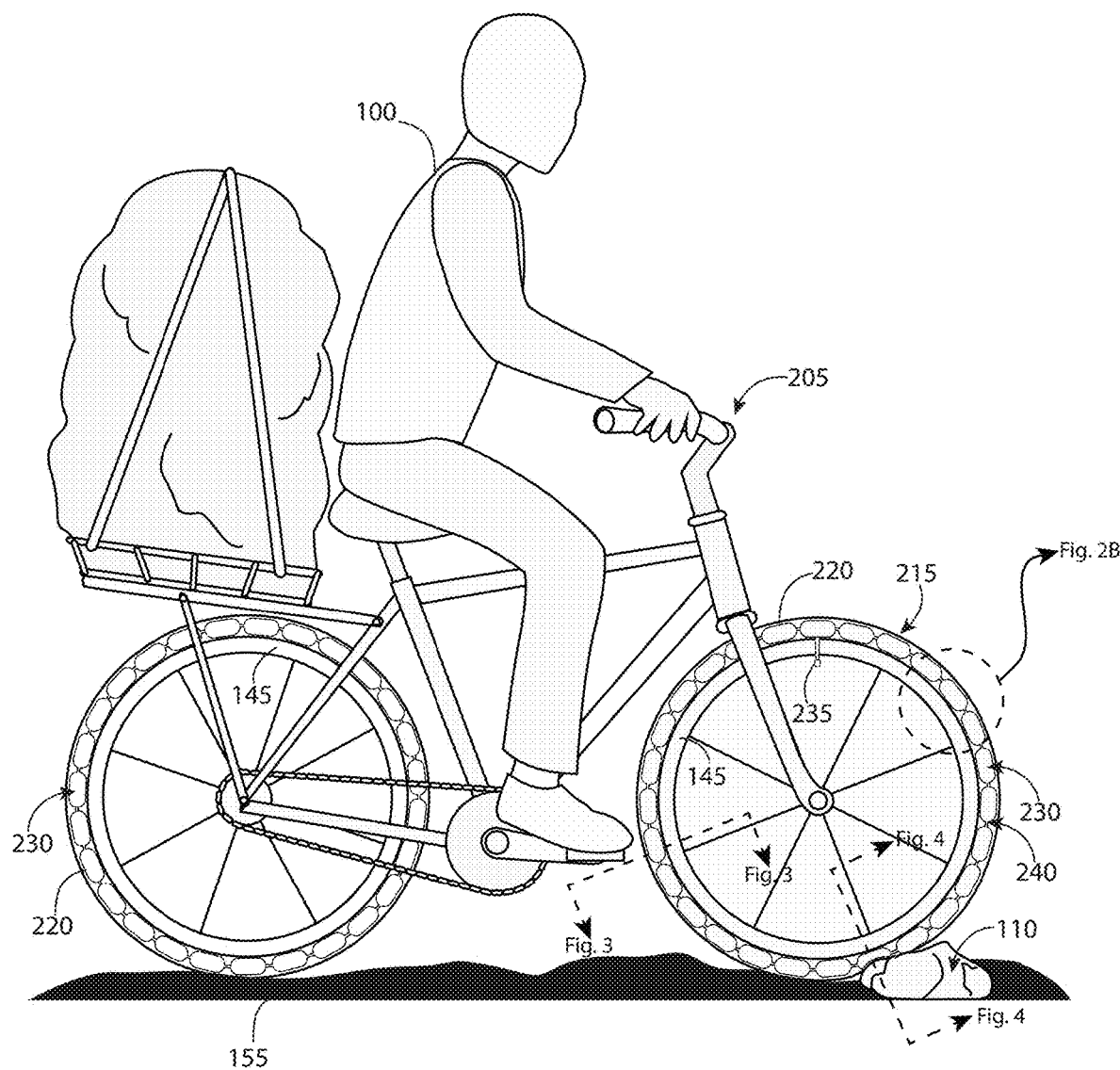
FIG. 2A is a schematic illustration of a bicycle rider operating a bicycle while traversing over an impediment where the bicycle comprises a bike tire having a segmented inner tube therein, according to one embodiment.
Figure 2B:
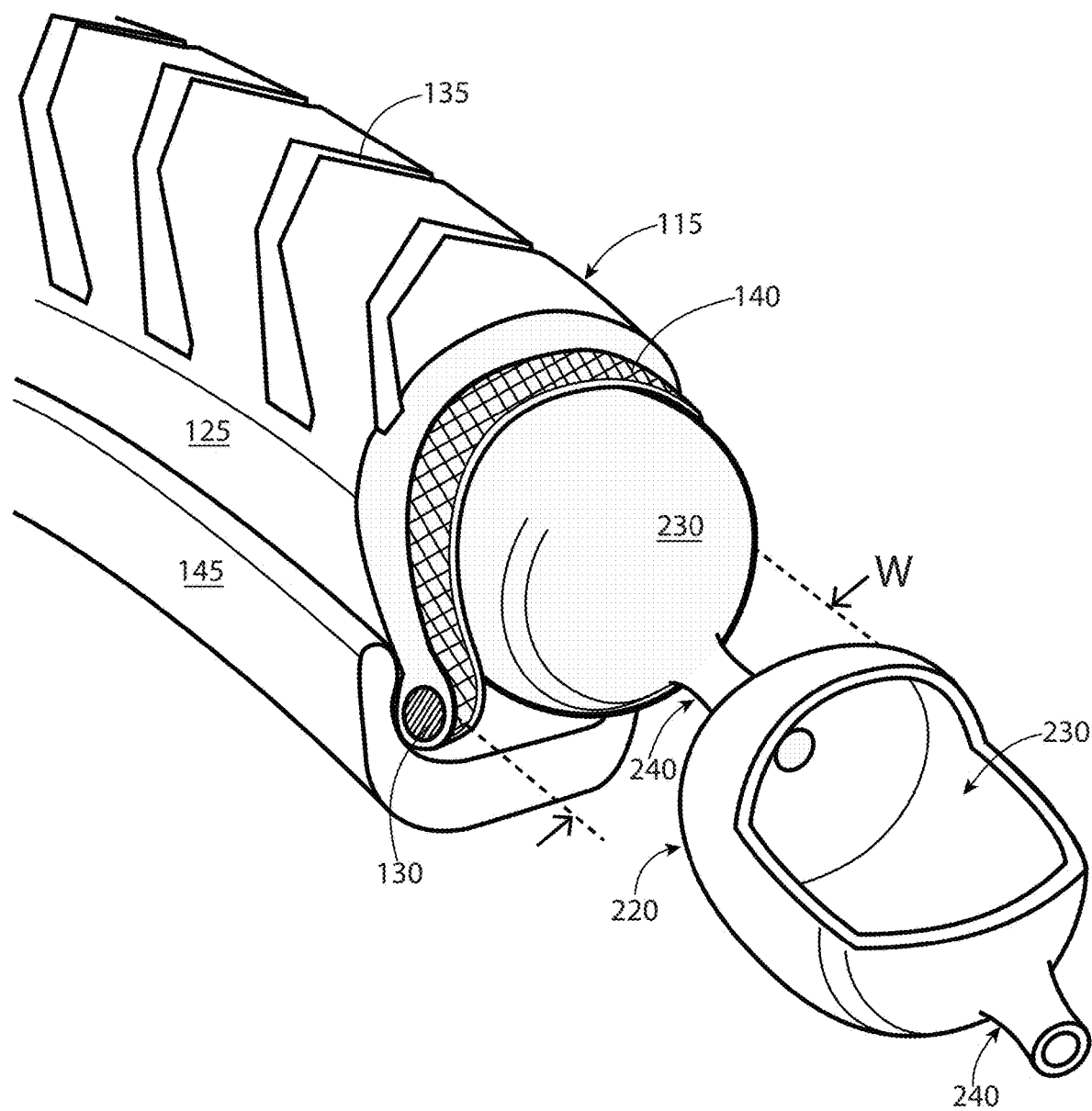
FIG. 2B is a 3D partial broken view of a portion of the bike tire including the segmented inner tube, according to one embodiment.

FIG. 2A shows a schematic illustration of the bicycle rider 100 operating a bicycle 205 while traversing over the impediment 110 where the bicycle 205 comprises a bike tire 215 having a segmented inner tube 220 embedded therein, while FIG. 2B shows a 3D partial broken view of a portion of the bike tire 215 including the segmented inner tube 220, according to one embodiment.

The bicycle 205 may be retrofitted with the segmented inner tube 220. The segmented inner tube 220 may comprise segmented air volumes with controlled air passage during inflation stage and separate air passage profile during compression stage, where the segmented air volumes share a single fill point. In particular, the segmented inner tube 220 comprises a plurality of bladders 230 having a common fill valve 235 and a plurality of interconnects 240 respectively disposed between the plurality of bladders 230. Each one of the plurality of interconnects 240 is configured to control airflow between adjacent ones of the plurality of bladders 230. As will be described in detail below, the interconnects 240 may be designed to allow for an increase in air pressure within an impacted one of the plurality of bladders 230 by substantially limiting air escape from the bladder 230' impacted at the contact patch 160. In other words, there would be limited escaped air from the impacted bladder 230' that traverses the associated interconnect 240 into the adjacent one of the bladders 230. The plurality of interconnects 240 sufficiently limits escaping fast-flow air from the impacted bladder 230', such that it causes a spike of air pressure within the impacted bladder 230'. Air pressure within the impacted bladder 230' is increased because of the compression of the impacted bladder 230' coupled with the limited escape of air from that impacted bladder 230'. That spiked air pressure counters the resistant force $R_F$ acting upon the impacted bladder 230' and culminates in a contact patch 160 that is small enough (or not flattened enough) to prevent the bladder 230' from being pinched between the impediment 110 and/or ground 155, and the bicycle rim 145. For example, the air pressure within the impacted bladder 230' may spike up to 2× the air pressure within the segmented inner tube prior to impact. In some embodiments, air pressure within the impacted bladder 230' is increased by 10% during impact. For example, an impact resisting segmented inner tube 220 configuration may withstand a 30 PST impact force with only a 28 PSI inflation.

The plurality of bladders 230 may take the form of a unitary structure configured to allow for air pressure or any pneumatic pressure to be segmented or compartmentalized into each one of the plurality of bladders 230. The plurality of bladders 230 may, for example, be made of butyl ("polyisobutylene") rubber or latex material. It will be appreciated by those of ordinary skill in the art that the material used to create or form the plurality of bladders may comprise any material or method known in the art. The common fill valve 235 may be any air valve or pneumatic valve known in the art, for example, Schrader, Presta, or Woods/Dunlop to name a few. The common fill valve 235 allows for introduction of air pressure into all the plurality of bladders 230 without having to separately introduce air into each one of the plurality of bladders 230. Due to the presence of the plurality of interconnects 240, slow airflow may successfully pass through all the low airflow interconnects 240 and inflate all the plurality of bladders 230.

Additionally, the plurality of interconnects 240 may include any one of several configurations to allow a slow transfer of air between the plurality of bladders 230 while at the same time substantially limit quick transfer of air between the plurality of bladders 230. In particular, the plurality of interconnects 240 may comprise at least one or a combination of flow-based regulators, pressure-based regulators, controlled air valves, orifices, substantially narrow interconnecting tubes, one-way valves, or the like. Various embodiments of the plurality of interconnects 240 will be described and illustrated herein with the understanding that these embodiments are not an exhaustive set of examples.

Figure 3:
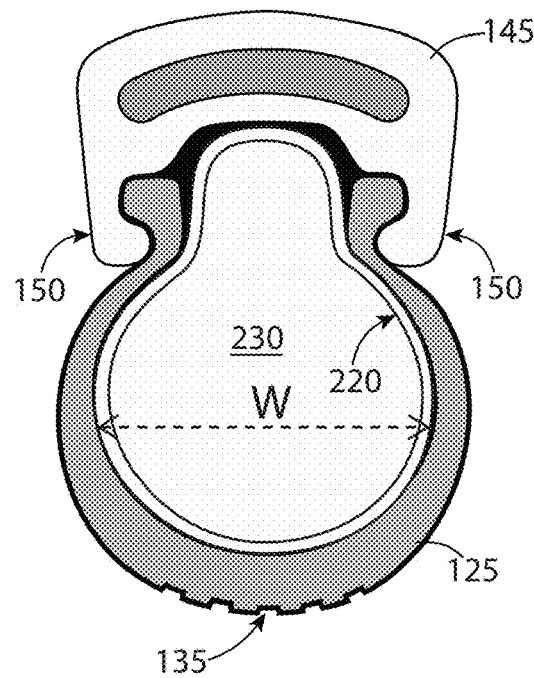
FIG. 3 is a 2D cross sectional illustration of a portion of the bike tire of FIG. 2A that is not impacted by the impediment, according to one embodiment.
Figure 4:
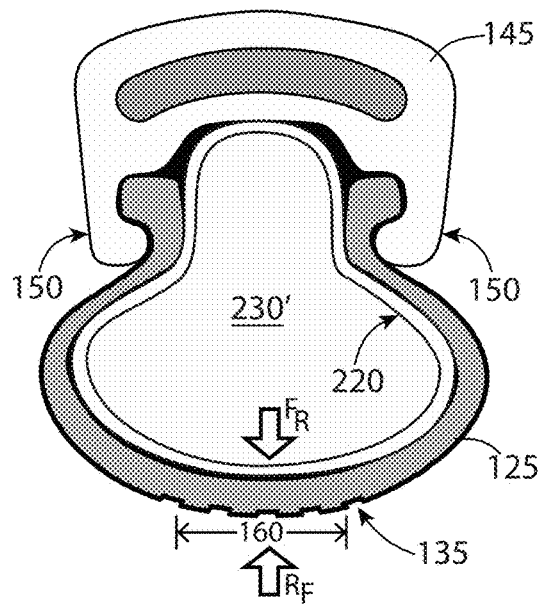
FIG. 4 is a 2D cross sectional illustration of a portion of the bike tire of FIG. 2A that is impacted by the impediment, according to one embodiment.

FIG. 3 shows a 2D cross sectional illustration of a portion of the bike tire 215 of FIG. 2A that is not impacted by the impediment 110, while FIG. 4 shows a 2D cross sectional illustration of another portion of the bike tire 215 of FIG. 2A that is impacted by the impediment 110, according to one embodiment.

As illustrated in FIG. 2A, the bicycle impacts the impediment 110, which may take the form of a stone, curb, uneven surface, branch, pot hole or the like. At the point of impact with the tire carcass 125, both the carcass 125 and the segmented inner tube 220 are compressed. Specifically, at least one of the plurality of bladders 230, referenced herein as the impacted bladder 230', may be compressed such that its volume is reduced. This compression response, in turn, increases the contact patch 160 of bicycle tire 215. As mentioned earlier, the contact patch 160 may refer to the square area of the tire carcass 125 and/or the tread 135 that actually impacts or touches the surface 155. Because most of the air within the impacted bladder 230' is contained therein during impact (due to the interconnections 240 that control the airflow between bladders 230) while the volume within the bladder 230' is reduced via impact compression, the air pressure within the impacted bladder 230' is increased.

In other words, because the entire segmented inner tube 220 is initially inflated at a defined air pressure (e.g., 50 PSI, 70 PSI, etc.), there will be a defined number of air molecules per unit of volume within each bladder 230. In response to impact with the impediment 110, the number of air molecules in the impacted bladder 230' remains substantially constant because the adjacent interconnections 240 substantially prevents air molecule flow to the adjacent ones of the plurality of bladders 230, while the volume of the impacted bladder 230' is reduced by way of compression (As described above and illustrated in FIG. 4). As a result, the impacted bladder 230' achieves air pressure that is higher than the defined air pressure in the other bladders 230.

The deformation of the impact bladder 230' coupled with substantially preventing airflow to other bladders 230 during time of impact, results in an increased impact pressure or reaction force $F_R$ within the impact bladder 230', enough to prevent pinching of the segmented inner tube 220 between the rim 145 and the surface 155. As an example, in response to impact with the impediment 110, the impact bladder 230' may have a volume reduced to ½ its original volume (or pre-impact volume). In such an embodiment, the air pressure and thus reaction force $F_R$ is doubled during impact. An increase in reaction force $F_R$ will minimize the risk of a pinch flat. In another example embodiment, a volume of the impact bladder 230' may be reduced to ⅕ its pre-impact volume, which would cause a 5× increase in reaction force $F_R$ or impact pressure.

Consequently, the segmented inner tube 220 illustrated in FIGS. 2A, 2B, 3, and 4 allow the bicycle tire 215 to traverse smooth surfaces in a regular or traditional fashion but then immediately resist intrusions of the carcass 125 by creating a large reaction force $F_R$ at the contact patch 160. This allows the segmented inner tube 220 to avoid rim 145 hits that may cause rupture. The segmented inner tube 220 configuration may also be advantageous in that it allows for a common air pressure across the plurality of bladders 230 to be lower relative the traditional inner tube of FIGS. 1A-1B. Again, this is because the segmented inner tube 220 creates an increased air pressure at the instance it's needed.

Figure 6:
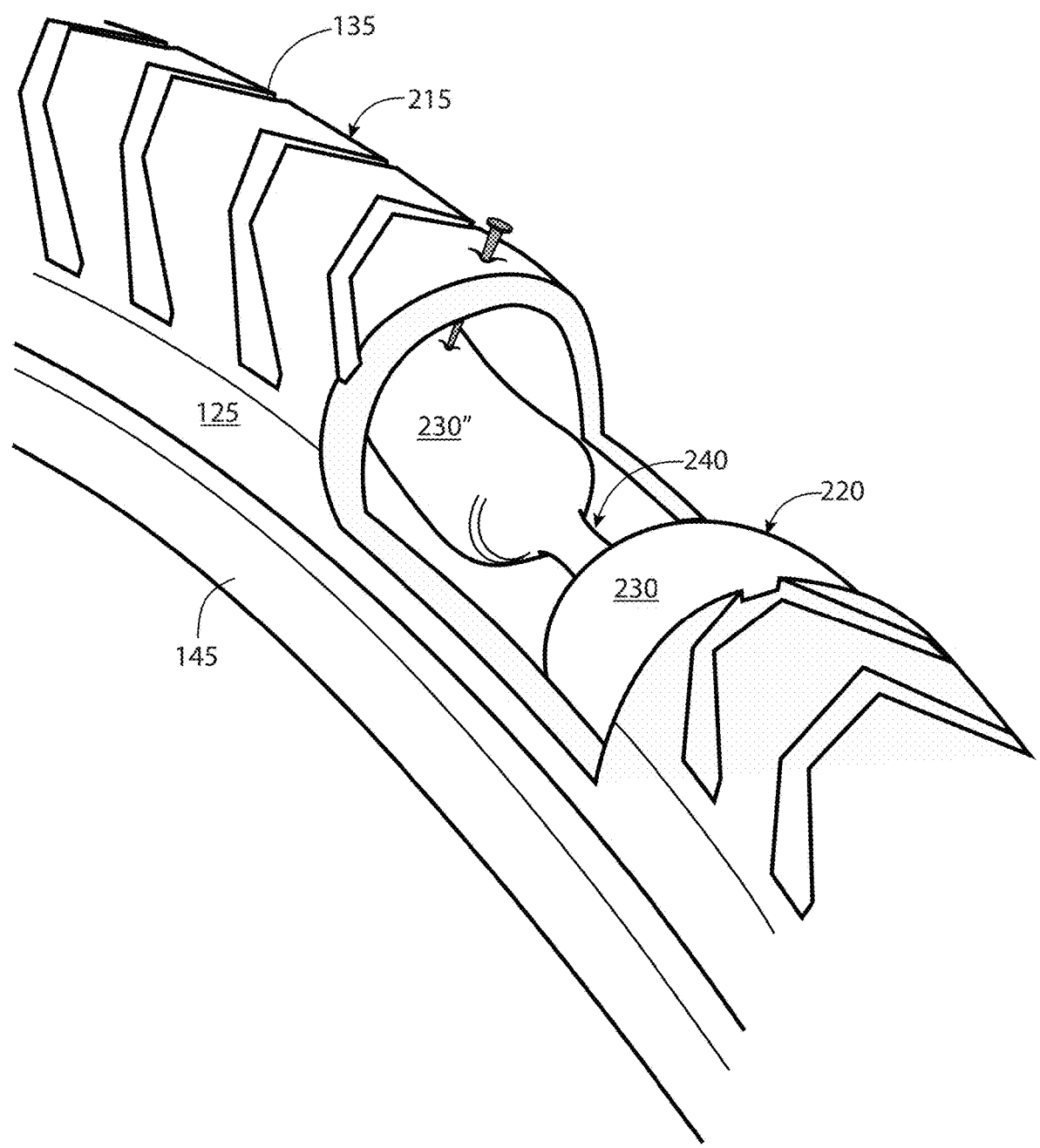
FIG. 6 is a 3D partial broken view of a portion of the FIG. 2A bicycle tire upon puncturing of the segmented inner tube, according to one embodiment.

FIG. 6 shows a 3D partial broken view of a portion of the FIG. 2A bicycle tire 215 upon puncturing one of the plurality of bladders 230 comprising the segmented inner tube 220, according to one embodiment. Another advantage to the segmented inner tube 220 is its ability to prevent punctures from incapacitating the entire segmented inner tube 220 and allow the bicycle rider 100 to continue riding her bicycle 205 uninterruptedly.

In response to a puncture through the carcass 125 and the segmented inner tube 220, respective ones of the plurality of interconnections 240 operate to effectively isolate a punctured one of the plurality of bladders 230" from the remaining inflated bladders 230. As will be discussed in detail below, the plurality of interconnects 240 may be operable to control airflow between bladders 230. Because air escapes through a puncture point within the punctured bladder 130, this effectively drastically lowers the air pressure therein. Due to the difference in air pressure between each of the two bladders 230 respectively disposed adjacent the punctured bladder 230", there is an attempt of fast airflow from the adjacent two bladders 230 into the punctured bladder 230". The respective interconnections 240 may detect and/or react to the fast airflow by substantially limiting any airflow into the punctured bladder 230" from any of the adjacent non-punctured bladders 230. Such a response by the respective interconnections 240 to the change in air pressure between adjacent bladders 230 and 230", results in preventing substantial air loss from the non-punctured bladders 230, thereby maintaining the current air pressure throughout the segmented inner tube 220.

In one embodiment, if the pressure is very high in a respective one of the bladders 230 relative its adjacent two bladders 230, at any time (i.e., not just at impact), the respective interconnections 240 may take a form of a valve that closes or seals. This achieves a sealed-off or isolated bladder configuration, which renders the tire 215 useable despite a flat spot corresponding to the high-pressure bladder 230 (which is sealed off). In fact, a second bladder failure may still allow the inner tube 220 to support a rolling wheel. From a practical perspective, in response to the second bladder failure or potentially multiple subsequent bladder failures, the inner tube 220 would be changed the next opportunity the rider 100 has, thereby extending the length of the ride time.

The segmented inner tube 220 may also be advantageous in helping prevent tire 215 blowouts from occurring. As will be appreciated by those of ordinary skill in the art, a blowout may be caused by a rapid loss of inflation pressure of a pneumatic tire leading to an explosion. The result may be the beads 130 of the tire carcass 125 becoming dislodged from the rim flanges 150 and allowing the inner tube 120 to extrude from the tire carcass 125. One cause for this is traversing an object that cuts or tears through the tire carcass 125 and the inner tube 120 thereby causing pressurized air to rapidly escape.

Because of the air pressure isolation features described above, even if one of the plurality of bladders 230 is punctured, the adjacent interconnects 240 may operate to isolate the deflated bladder 230" from the remaining plurality of bladders 230 that have the defined air pressure. Because only a relatively small portion of the segmented inner tube 220 loses air pressure, the risk that the tire carcass 125 would be dislodged because of a sudden overall reduction in air pressure within the inner tube is minimized.

As discussed above, the segmented inner tube 220 comprises the plurality of bladders 230 that are interconnected sequentially via the plurality of interconnections 240. Such arrangement allows for a slow initial inflation (relative the inner tube of FIG. 1A-1B) of the plurality of bladders 230. All the plurality of bladders 230 are configured to be inflated within a reasonable amount of time (relative inflation of the inner tube 120 of FIGS. 1A-1B), while severely limiting the quick transfer of airflow between respective ones of the plurality of bladders 230. In other words, the plurality of interconnects 240 may operate to achieve air pressure isolation of the inner tube sections and local pressure increase within the impacted bladder 230' in response to the impact with the impediment 110 or ground surface 155. The pressure increase at the impacted bladder 230' results from the much decreased air volume within that impacted bladder 230' during the impact, thereby causing the air pressure within that impacted bladder 230' to increase.

It will be appreciated by those of ordinary skill in the art, that other embodiments of the plurality of bladders 230 and the plurality of interconnects 240 are contemplated to achieve air pressure isolation of the inner tube sections and local pressure increase at a point of impact with the impediment 110 or the ground surface 155. In other words, there are several ways to improve introducing air faster into the cavities but at the same time limit high speed or high pressure flows.

A few example design embodiments will be discussed herein, but other variations are well within the scope of this patent application.

Figure 7A:
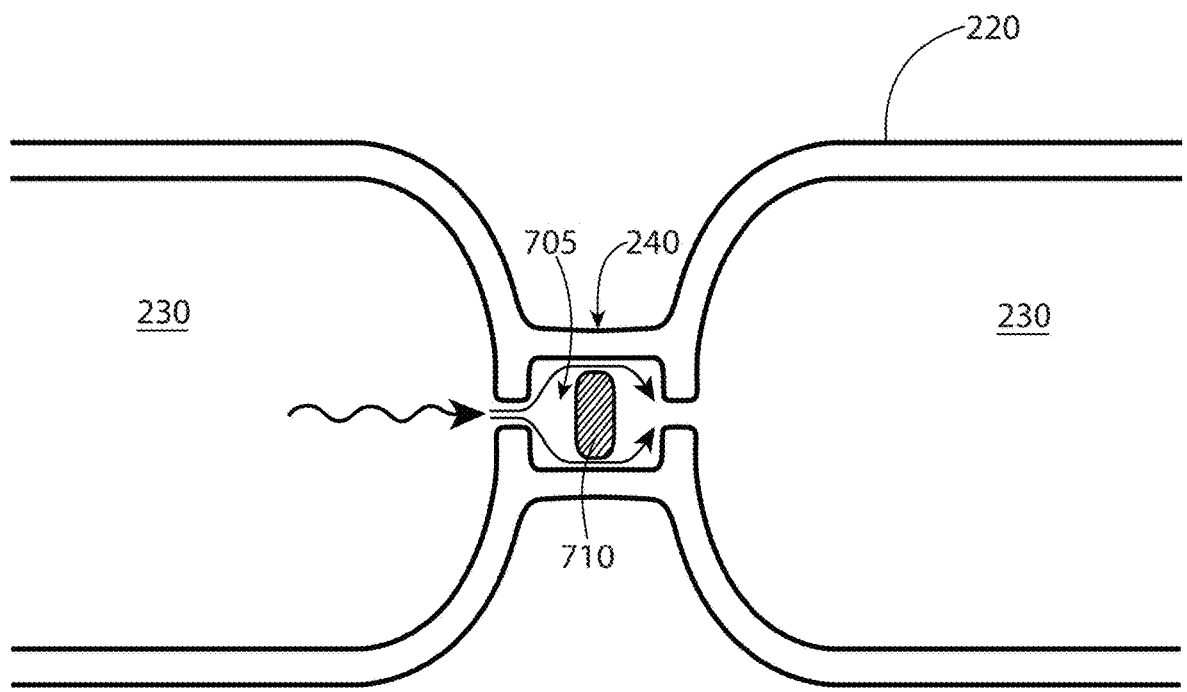
FIGS. 7A-7B are schematic 2D illustrations of a flow-rate valve configured to occlude airflow between adjacent bladders in response to high airflow, according to one embodiment.
Figure 7B:
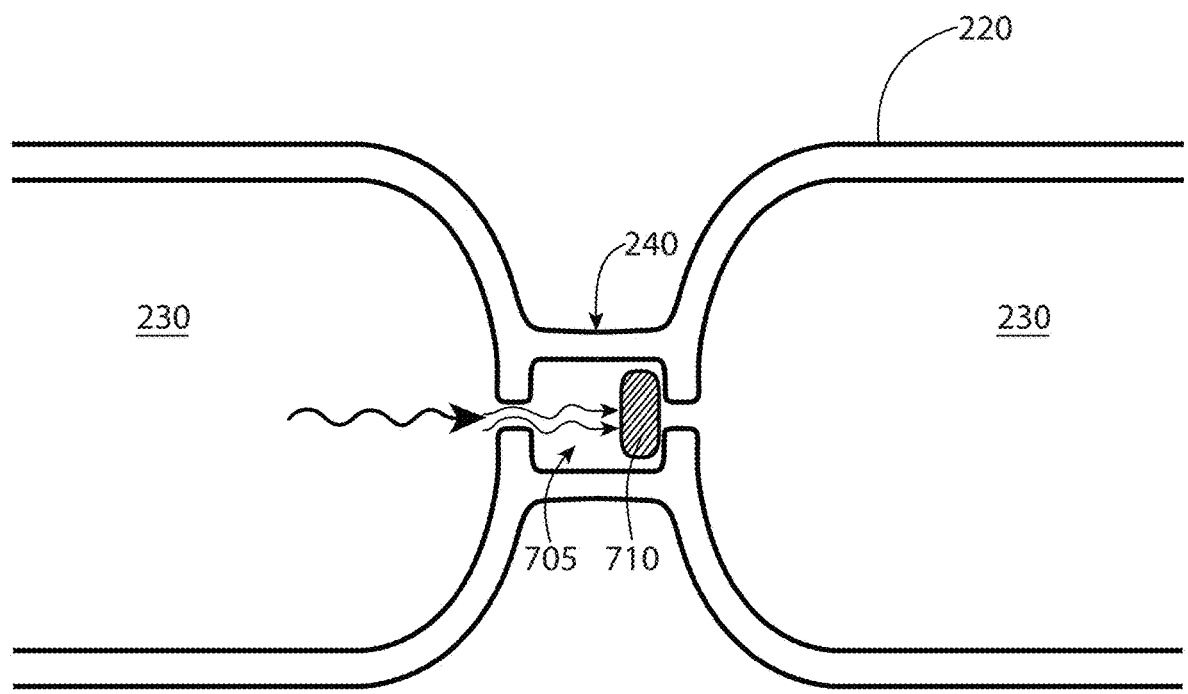

Reference will now be made to FIGS. 7A-7B. Each of which depicts a partial cross-sectional view of adjacent ones of the plurality of bladders of FIG. 2B, interconnected via one of the plurality of interconnections 240, according to various illustrated embodiments.

A basic design for the segmented inner tube 220 has been illustrated in FIGS. 2A-2B. In particular, the plurality of interconnections 240 or orifices disposed between the plurality of bladders 230 may take the form of passageways. These passageways may be small enough in size such that it almost completely occludes the free flow of air between bladders 230. Practically, the passageways may allow for a substantially small amount of airflow between bladders 230 while preventing a substantially high airflow from passing through the passageways and between the plurality of bladders 230.

In one embodiment, the passageways may be formed via cinching the inner tube 220 while in its pre-vulcanized state. The pre-vulcanized inner tube 220 may be readily cinched by any known system, device, or method to create the plurality of segments or bladders 230 described above. Upon cinching, the pre-vulcanized inner tube 220 may subsequently be run through the vulcanization procedures to solidify the shape into a segmented inner tube 220 having the plurality of bladders 230 and interconnections 240.

In other embodiments, each of the interconnections 240 may include an open cell foam (or open cell plug, similar to a sponge) material embedded within its cavity. The open cell material may be selected based on the specific airflow control characteristics of the material. For example, a thicker foam material may allow for small airflow, while a thinner foam material may allow for increased airflow.

Reference is made to FIGS. 7A-7B, which depict the interconnection 240 as a flow-based regulator, according to one embodiment. The interconnection 240 may take the form of an orifice forming a cavity 705 with a diaphragm 710 in it (e.g., disc). As illustrated in FIG. 7A, slow airflow may flow through the cavity 705 without disturbing the diaphragm 710. However, in response to a fast-flow of air (as illustrated in FIG. 7B) from one of the bladders 230, the diaphragm 710 is dislodged and occludes the entrance into the adjacent bladder 230. As such, fast airflow is prevented from traversing the orifice and into the adjacent bladder 230. The diaphragm 710 may take the form of any material known in the art, which has air occlusion properties.

Figure 8A:
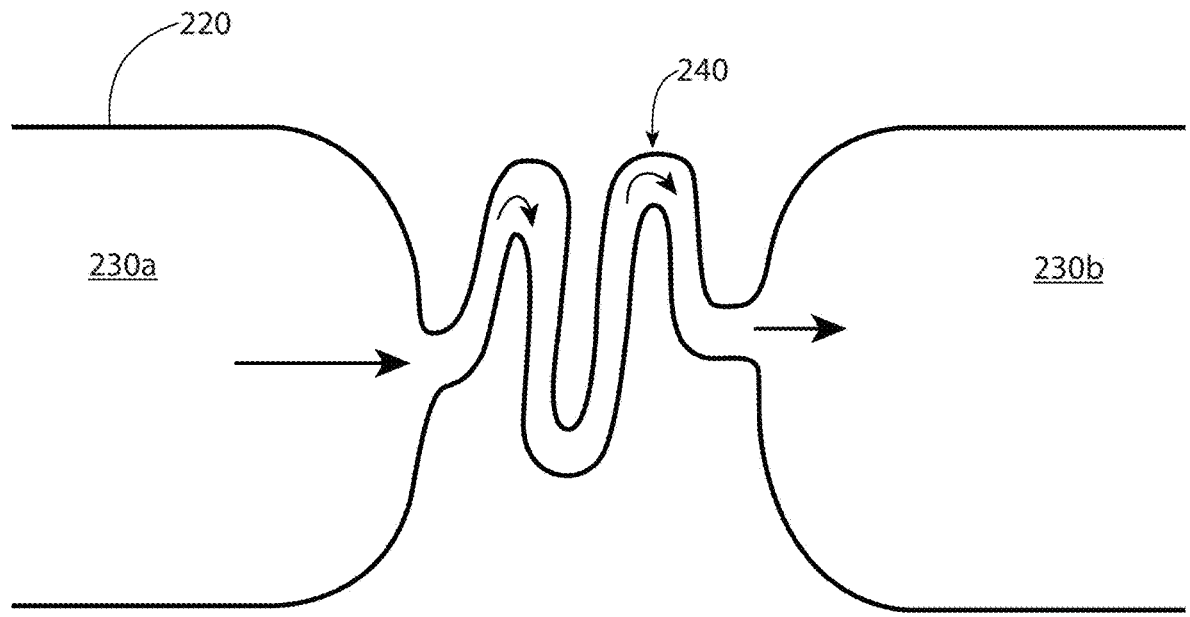
FIGS. 8A-8B are schematic cross-sectional 2D illustrations demonstrating an interconnection as a pressure-based regulator, according to one embodiment.
Figure 8B:
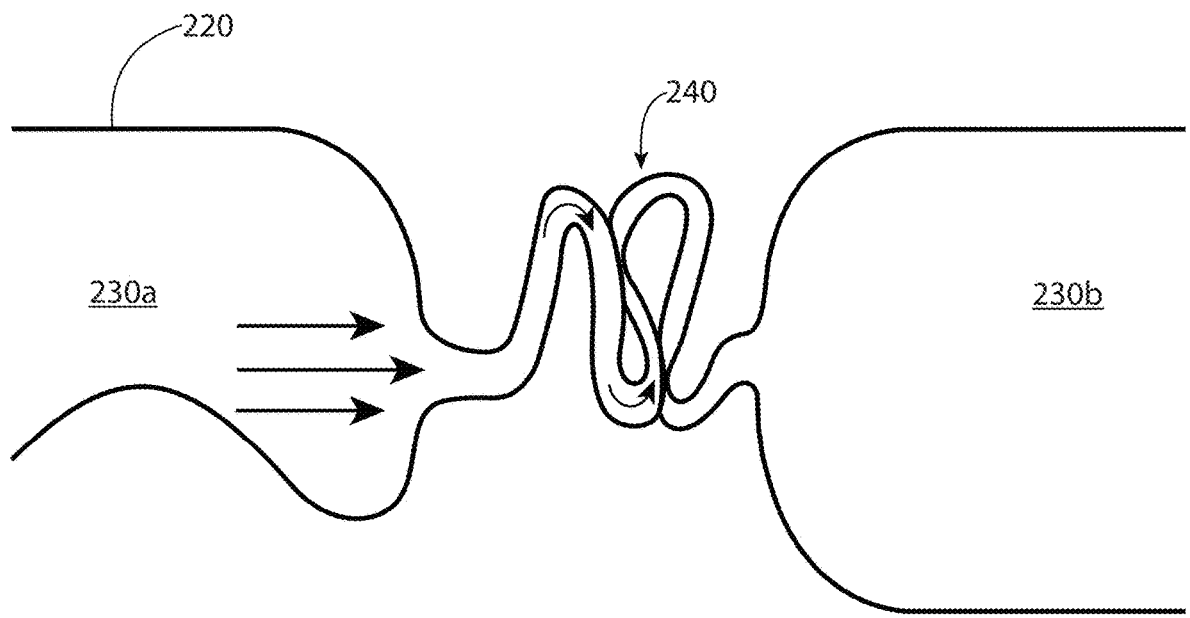

Reference is made to FIGS. 8A-8B, which depict the interconnection 240 as a pressure-based regulator, according to one embodiment. The interconnection 240 may take the form of an elongated passageway that leverages air pressure of adjacent bladders 230 to regulate airflow therebetween. As illustrated in FIG. 8A, low air pressure (e.g., air pressure at the defined pressure of the tire) in a first bladder 230a may cause slow airflow throughout the passageway and into an adjacent second bladder 230b. On the other hand, as illustrated in FIG. 8B, high air pressure in the first bladder 230a (e.g., in response to compression due to impact) may cause fast airflow through the elongated passageway such that the passageway bloats against itself and occludes a space within the passageway. As such, the interconnection 240 may serve as a pressure-based regulator of the plurality of bladders 230.

Figure 9A:
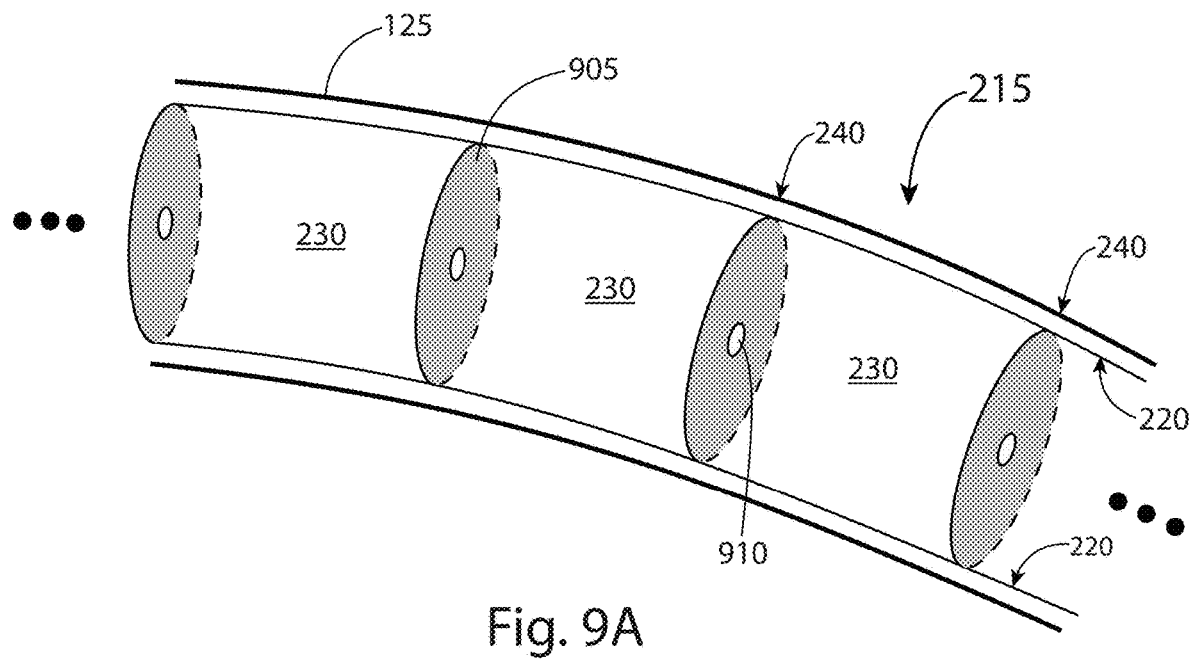
FIGS. 9A-9B are a cross-sectional partial side view illustration of the bicycle tire comprising the segmented inner tube which includes the plurality of bladders, according to one embodiment.
Figure 9B:
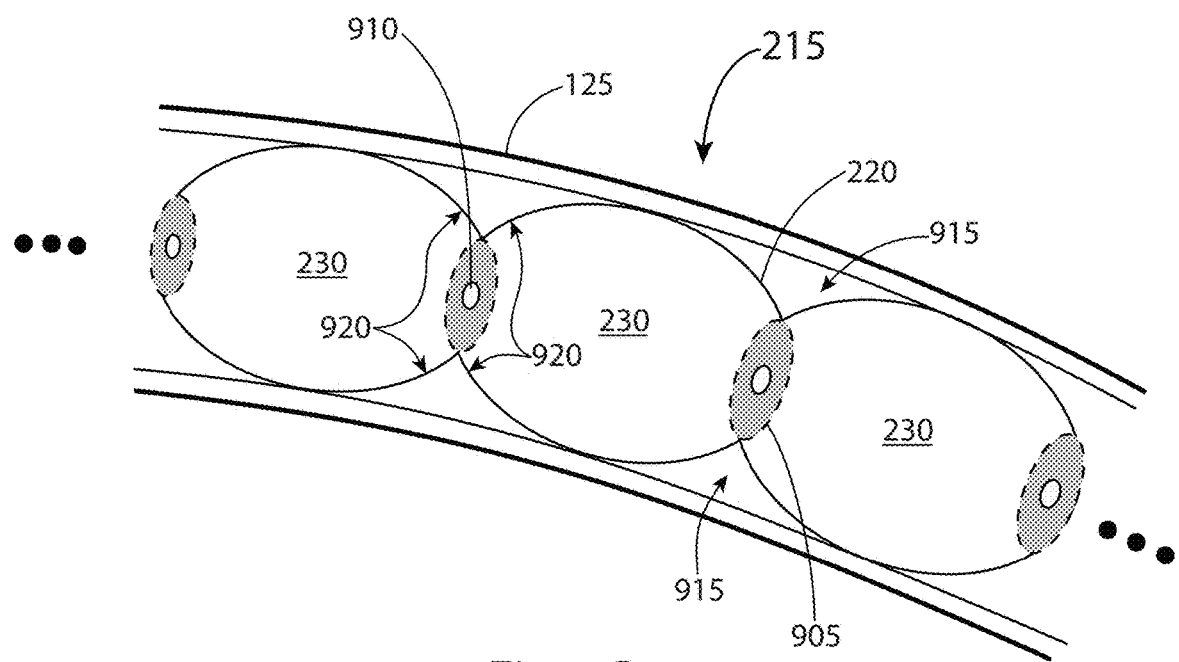

Reference is made to FIGS. 9A-9B, which show a cross-sectional partial side view illustration of the bicycle tire 215 comprising the segmented inner tube 220 including the plurality of bladders 230, according to another illustrated embodiment.

As illustrated in FIG. 9A, the tire carcass 125 may envelope the segmented inner tube 220 comprising a plurality of dividers 905 disposed therein to form the plurality of bladders 230 where the bladders 230 may, for example, take a shape of compartments or chambers. The dividers 905 may be a circular or cylindrical configuration such that it fills a cross-sectional area of the segmented inner tube 220 thereby creating segments. A hole or orifice 910 may be embedded within each of the plurality of dividers 905 to allow for airflow transfer between the bladders 230 or chambers.

The plurality of dividers 905 may, for example, be pieces of rubber that is affixed to the inside of the segmented inner tube 220. In some embodiments, the dividers are of the same material as the inner tube 220. These rubber pieces may be affixed using an adhesive (e.g., glue or the like), fastener, or any other method known in the art. In one embodiment, the plurality of rubber dividers 905 may be placed within the segmented inner tube 220 during pre-vulcanization stage. Then, the segmented inner tube 220 with the plurality of rubber bladders 905 embedded therein may undergo vulcanization which would cause the dividers 905 to adhere to an inside of the segmented inner tube 220. It will be appreciated by those of ordinary skill in the art that other known methods of manufacturing may be employed to achieve the illustrated embodiment of FIG. 9A.

The embodiment of FIG. 9A may be advantageous because it allows for a smooth traversal of the bicycle wheels 215 along the surface 155. Specifically, the plurality of bladders 230 may have cylindrical peripheries that substantially follow the shape of the tires carcass 125 without dipping in a space between the dividers 905. In other words, the walls of the plurality of bladders 230 completely span an interior circumference of the segmented inner tube 220. As such, when the bicycle rider 100 traverses along the ground surface 155, he/she may not feel gaps along the plurality of bladders 230 comprising the segmented inner tube 220.

Additionally, in response to impact with the surface 155 and/or the impediment 110, the rubber divider 905 may bulge out toward an adjacent one of the plurality of bladders 230 due to the spike in pressure. The result is less bulging of the tire carcass 125 at its sidewalls even upon impact with the surface 155 and/or impediment 110.

As illustrated in FIG. 9B, the plurality of dividers 905 within the segmented inner tube 220 may partially fill the cross-sectional area of the segmented inner tube 220. In particular, the plurality of dividers 905 of FIG. 9B form a gap 915 with the tire carcass 125. The hole or orifice 910 may still be embedded within each of the plurality of dividers 905 to allow for airflow transfer between the bladders 230.

The resulting gap 915 with the tire carcass 125 is formed because walls 920 of the plurality of bladders 230 curve to meet respective ones of the plurality of dividers 905. Such curvature of the bladder walls 920 amounts to a reduced hoop stress of the segmented inner tube 220. Hoop stress is the accumulated force of a pressure within the tire 215 that is held back by the large circumference of the bladder 230. It should be noted that two circumferences exist. A first circumference is the small circumference across the inner tube 220 while a second circumference is across the wheel's axle and is much larger. As a result, cables are embedded in the tire bead to resist the accumulated stress. Each square inch of pressure in the tire 215 pushes against the adjacent space and together attempt to increase the radius of the tire 215. The sum of this force is hoop stress. Downward necking of a contact area between the bladders 230 reduces the amount of force used to increase the radius, and therefore lower the hoop stress proportionately.

In particular, the reduced hoop stress in the FIG. 9B embodiment is because of the curvature of the bladder walls 920. The sharper the curvature of the bladder walls 920, the more pressure needed to cause the bladder walls 920 to swell closer to the tire carcass 125 layer. In contrast, the plurality of bladders 230 in the FIG. 9A embodiment having its walls substantially follow the shape of the tire carcass 125 without dipping, may have a high hoop stress similar to that embodied by the inner tube 120 of FIGS. 1A-1B.

The reduced hoop stress embodiment in the FIG. 9B segmented inner tube 220 embodiment is advantageous because reduced hoop stress, in turn, reduces the likelihood of the bicycle tire 215 blowing off the rim 145. A blowout may, for example, occur when the tire 215 is injected with air pressure that is too high for a particular size of the tire 215. As discussed above, because the curved bladder walls 920 require higher pressure to expand, the cumulative pressure that tends to swell the segmented inner tube 220 off the rim 145 may be much higher. In other words, it may take more air pressure to inflate the plurality of bladders 230 to a point where those bladders 230 will have full contact with the carcass 125.

Although the segmented inner tube 220 configuration of FIG. 9B includes formation of the gaps 915, the tire carcass 125 may be thick enough such that the bicycle rider 100 does not feel the respective dips of the curved bladder walls 920 toward each of the plurality of dividers 905. Additionally, because of the decreased hoop stress of the FIG. 9B segmented inner tube 220, a lightweight tire 215 may be employed. This is because the beads 130 of the carcass 125 and the flanges 150 the beads 130 lock into may be configured to be less durable than in the embodiment of FIG. 9A.

Figure 10A:
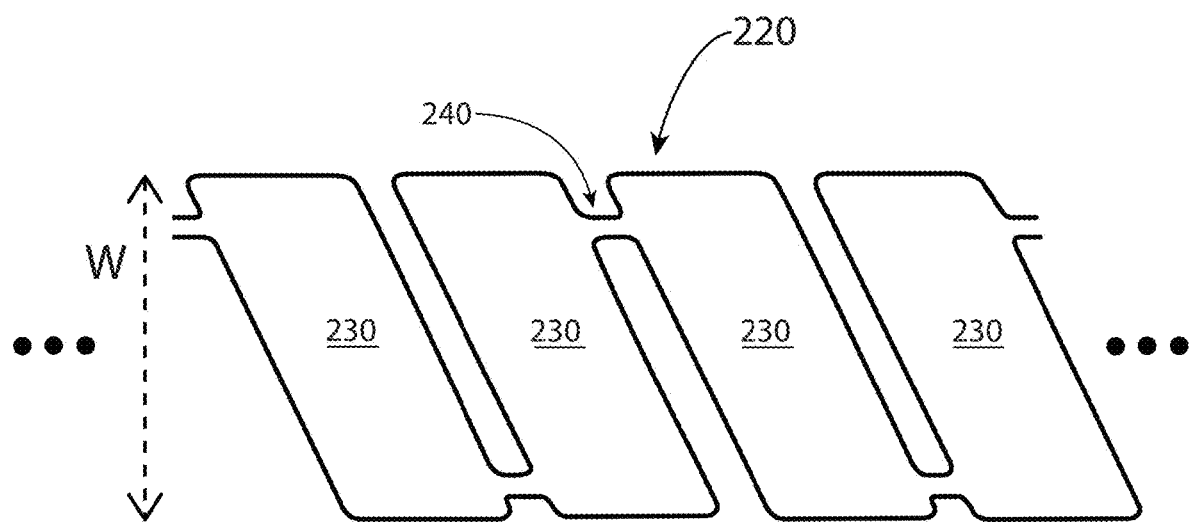
FIGS. 10A-10C are 2D cross-sectional top views of the segmented inner tube of FIGS. 2A-2B, according to another embodiment.
Figure 10B:
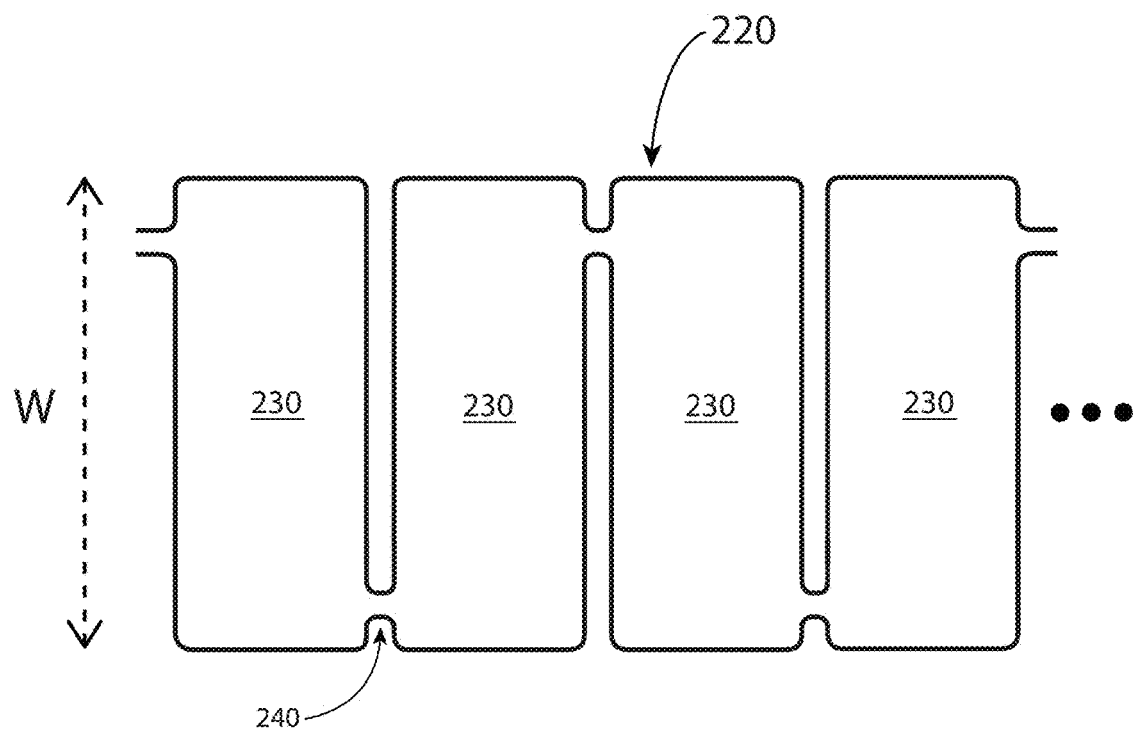
Figure 10C:
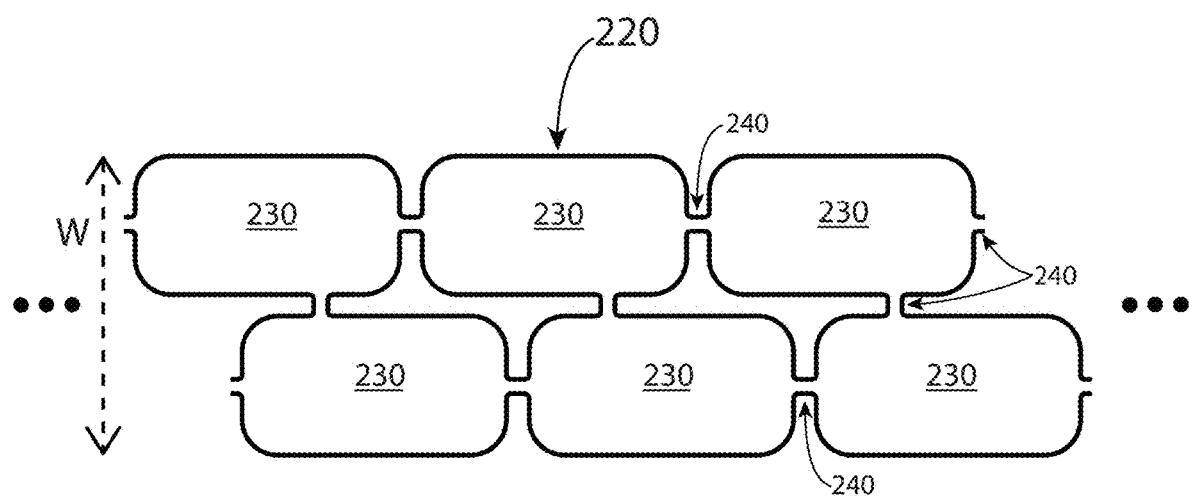

FIGS. 10A-10C show a cross-sectional 2D top view of the segmented inner tube 220 of FIGS. 2A-2B, according to another illustrated embodiment.

FIG. 10A shows a 2D top view of a portion of the segmented inner tube 220. In this embodiment, the plurality of bladders 230 are zig-zagged and angled relative a cross-sectional width W of the tire 215. As in prior embodiments discussed above, the plurality of bladders 230 are interconnected via the plurality of interconnections 240. These interconnections 240 may, for example, take the form of an orifice or small opening in the bladder 230 which allow for controlled airflow between the bladders 230. The segmented inner tube 220 of FIG. 10A may be advantageously angled such that at any point in time the contact patch 160 with the ground surface 155 will include at least a portion of one of the plurality of bladders 230, rather than having instances where solely an air gap—between the bladders 230 and the carcass 125 is being compressed at the contact patch 160. The plurality of bladders 230 may be arranged side-by-side (i.e., along the lengths of the bladders 230) to obtain a low profile tire 215 configuration and may be angled to reduce or substantially eliminate empty space between the bladders 230.

FIG. 10B shows a 2D top view of a portion of the segmented inner tube 220 where the plurality of bladders 230 are interconnected by the interconnections 240 using a zig-zag type of configuration along the cross-sectional internal width W of the tire 215 without angling. FIG. 10C shows a 2D top view of a portion of the segmented inner tube 220 where the plurality of bladders 230 are in a stepped configuration. It will be appreciated that the internal width W of the tire 215 in the FIG. 10A embodiment may be less than the internal tire 215 width W in the FIG. 10B embodiment, as well as the FIG. 10C embodiment.

The zig-zag embodiment of FIG. 10B achieves a larger contact patch 160 with less tire 215 weight. The tire 215 may be wider on the contact but not tall, which limits the roll of the tire caused when the rim 145 is coupled to the carcass 125 having a long annular and narrow bladder 230. In other words, the tire 215 has a smaller sidewall relative the tire 115 in the conventional design of FIG. 1A-1B. The roll of the tire phenomenon typically occurs when the bladders 230 are sequentially disposed lengthwise across the circumference of the carcass 125, while narrow in width, the tire 125 has a tendency to roll over its tall sidewalls, especially upon turning. As such, the zig-zag bladder positioning alleviates the rolling tire phenomenon. Because the FIG. 10B zig-zag embodiment does not necessitate large sidewalls and a large inflated space, the tires 215 may, for example, be half the weight of a conventional tire. Similarly, the FIG. 10C stepped configuration of the bladders 230 also alleviated the rolling tire phenomenon and achieves a low profile tire with large contact area.

It will be appreciated that high performance tires may be wide and flat to prevent roll of the tire. Consequently, the FIG. 10B design provides a low profile tire 215 which is advantageous for high performance. It will be noted that traditionally, whenever a tire configuration has small space between the rim and the tire, high air pressure is needed to prevent pinch flats. Although the FIG. 10A-10C embodiments have smaller space between the rim 145 and the tire 215, the risk of pinch flats is reduced because of the segmented inner tube 220 design. As such, these embodiments do not require high air pressure.

Figure 10D:
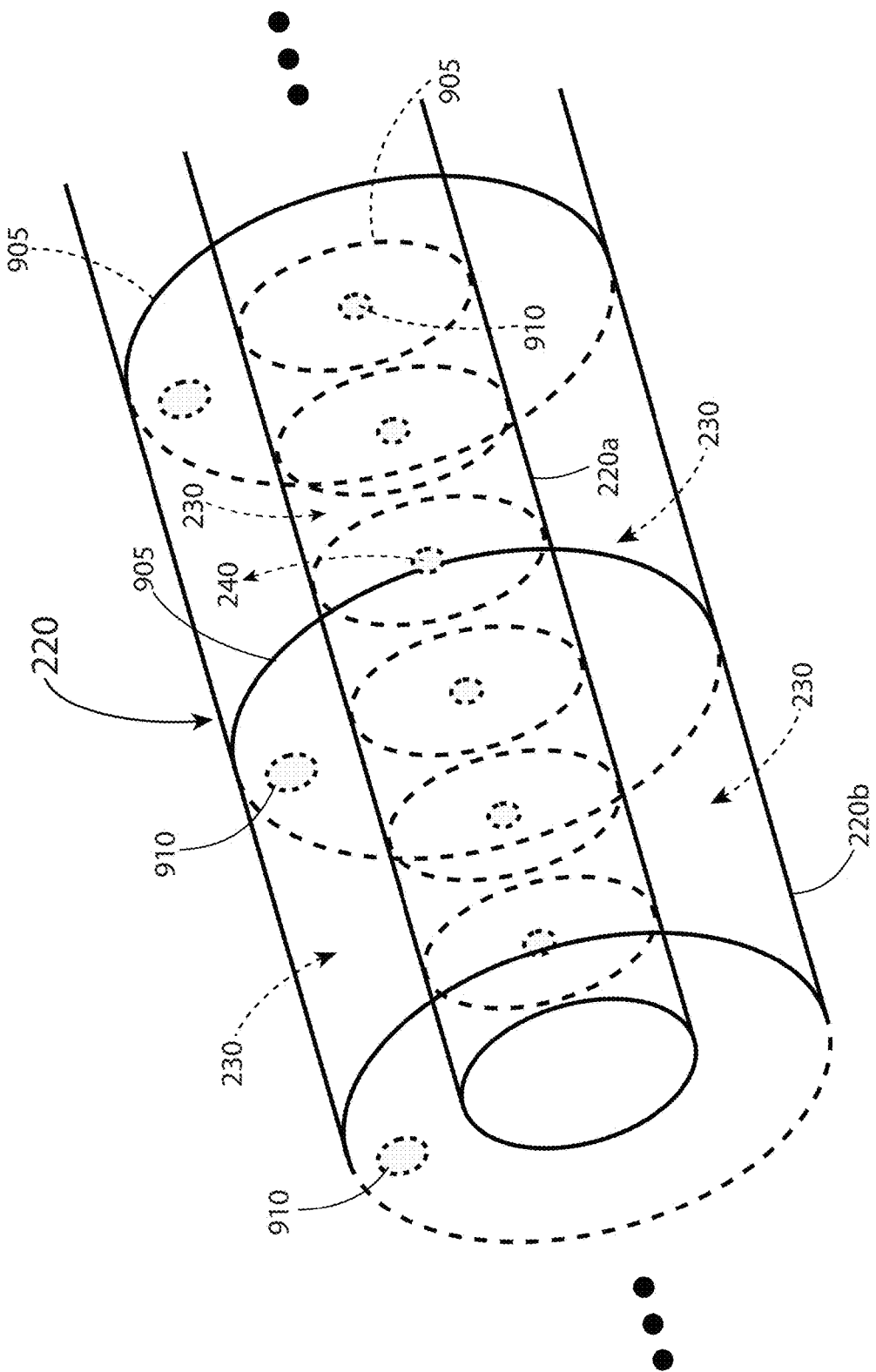
FIG. 10D is a partial 3D schematic illustration of the segmented inner tube, according to another embodiment.

FIG. 10D shows a partial 3D schematic illustration of the segmented inner tube 220, according to another illustrated embodiment. The embodiment illustrated in FIG. 10D is a nested inner tube configuration. The segmented inner tube 220 comprises a first segmented inner tube 220a positioned within a second segmented inner tube 220b. The first and second inner tubes 220a, 220b may, for example, comprise the FIG. 9A and/or FIG. 9B configurations. As such, the bladders 230 of the respective inner tubes 220a, 220b may be formed by the dividers 905 or walls, where the plurality of bladders 230 may be interconnected via the orifice 910. In some embodiments, the first and second tubes 220a, 220b may be isolated from the other, while other embodiments may have the first tube 220a interconnected to the second tube 220b via at least one orifice 910 such that both the first and second tubes 220, 220b are at a common air pressure and may be filled by a common fill valve. Of course, the first and second tubes 220a, 220b are not limited to a specific segmented inner tube configuration. The second tube 220b may have a large air volume within each of the plurality of bladders 230 as the spacing between the dividers 905 is large in comparison to the spacing between the dividers 905 of the first tube 220a. As such, the first tube 220a may comprise a greater number of bladders 230 than in the second tube 220b, where each of the first tube 220a bladders is smaller than those within the second tube 220b.

In response to impact with the surface 155 or the impediment 110, the impact initially intrudes upon the second tube 220b having the bladders 230 with large air volume. Typically, impact against the second tube 220b may compress respective bladders 230 such that the second tube 220b, in turn, impacts the first tube 220a. Because the first tube 220a comprises the bladders 230 store smaller air volume than in the second tube 220b, these small bladders 230 may double or at least drastically increase the air pressure therein upon compression of the first tube bladders 230.

As one example, the second tube 220b may have three first tube 220a bladders 230 nested under each one of the second tube 220b bladders 230. The impact may deflate the second tube 220b bladders 230 quickly, due to the large air volume within the second tube 220b. If the impact reaches the first tube 220a bladders, there may be at least one bladder 230 that becomes substantially hard relative the second tube 220b bladders 230. As such, this nested tube configuration allows for a pressure ramp to form. There may be the same air pressure throughout and between the first and second tubes 220a, 220b, with the first tube 220a having smaller bladders 230 or air cavities to create a localized pressure spike in response to compression. As a result, pinch flat resistance is achieved by having smaller bladders 230 that have a quick response to extreme compression of the second tube 220b bladders 230.

Figure 11A:
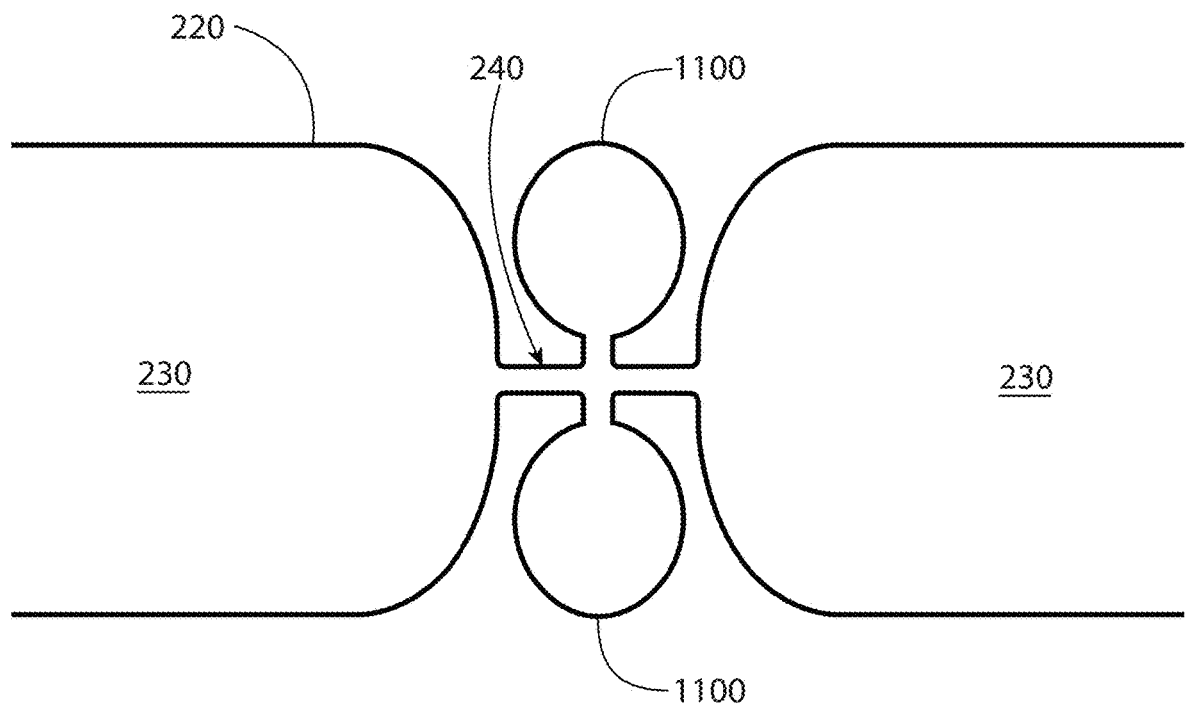
FIGS. 11A-11B are cross-sectional schematic illustrations of the segmented inner tube having ancillary bladders coupled thereto, according to several embodiments.
Figure 11B:
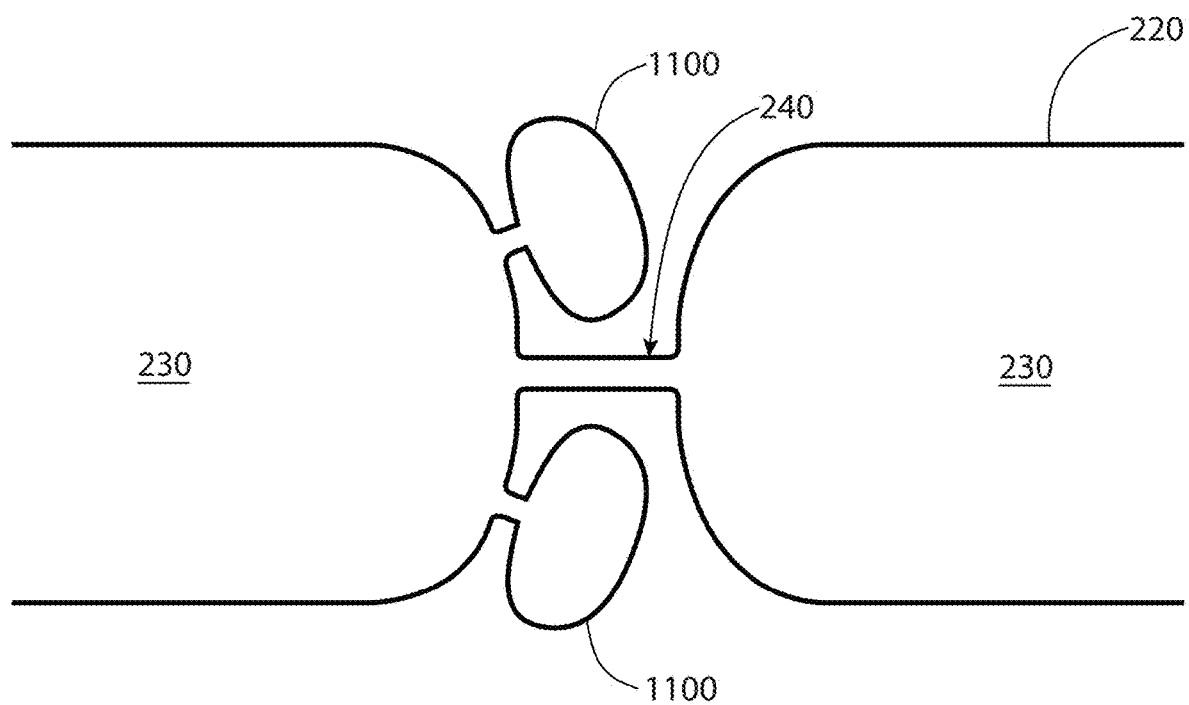

FIGS. 11A-11B show a cross-sectional schematic illustration of the segmented inner tube 220 having ancillary bladders 1100 coupled thereto, according to several embodiments. As mentioned above, embodiments having the segmented inner tube 220 with the plurality of bladders 230 sequentially interconnected may result in empty space gaps between successive bladders 230. These empty spaces may cause an uneven rolling of the tire 215 along the surface 155. This is one of the issues addressed in FIGS. 10A-10C.

Alternative and/or additional embodiments of the segmented inner tube 220 may include ancillary bladders 1100 disposed within these empty space gaps. The ancillary bladders 1100 may, for example, take the form of mini donuts or any other shape that may fill the gap between the bladders 230. The ancillary bladders 1100 may be coupled to the interconnections 240 (FIG. 11A) and/or to the bladders 230 themselves (FIG. 11B). FIG. 11A illustrates the ancillary bladders 1100 drawing air from the orifice 240, while FIG. 11B illustrates the ancillary bladders 1100 drawing air directly from the bladders 230. These ancillary bladders 1100 may serve to contour the outside shape of the segmented inner tube 220 to allow for a smoother traversal of the bicycle tire 215 along the surface 155. It will be appreciated that all characteristics of the interconnections 240 described above may be applicable to these ancillary bladders 1100 embodiments.

Figure 12A:
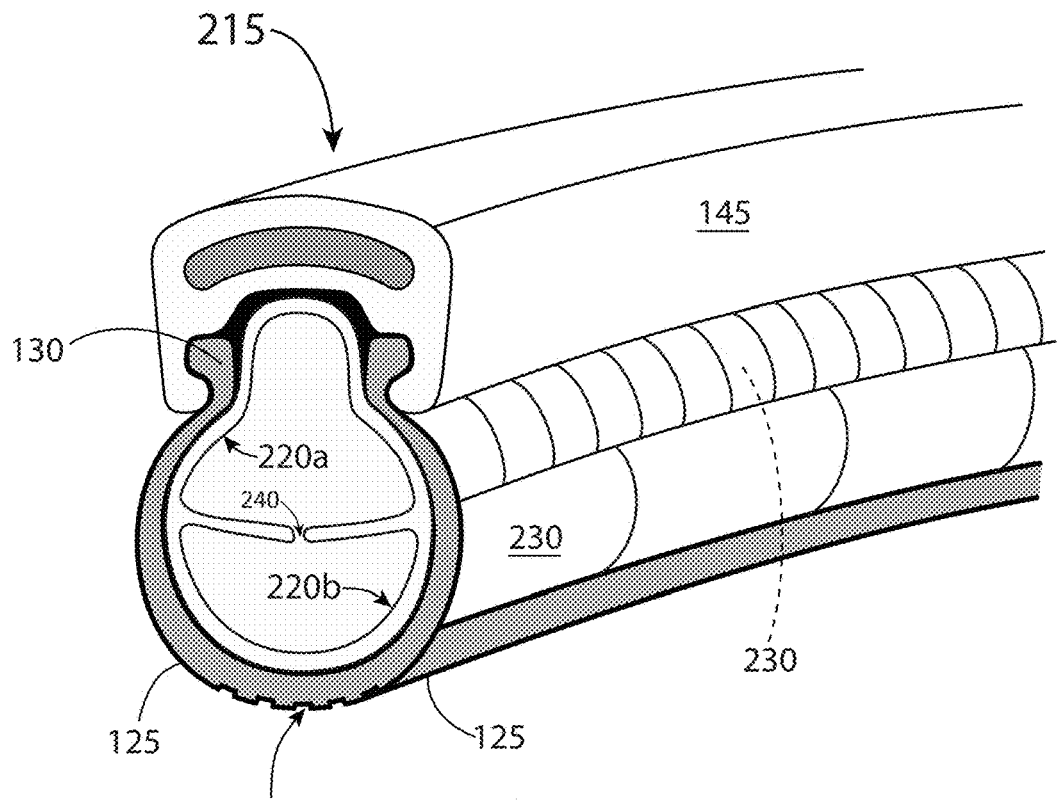
FIGS. 12A-12C are various configurations of the segmented inner tube having localized protection for pinch flats against the rim, according to several embodiments.
Figure 12B:
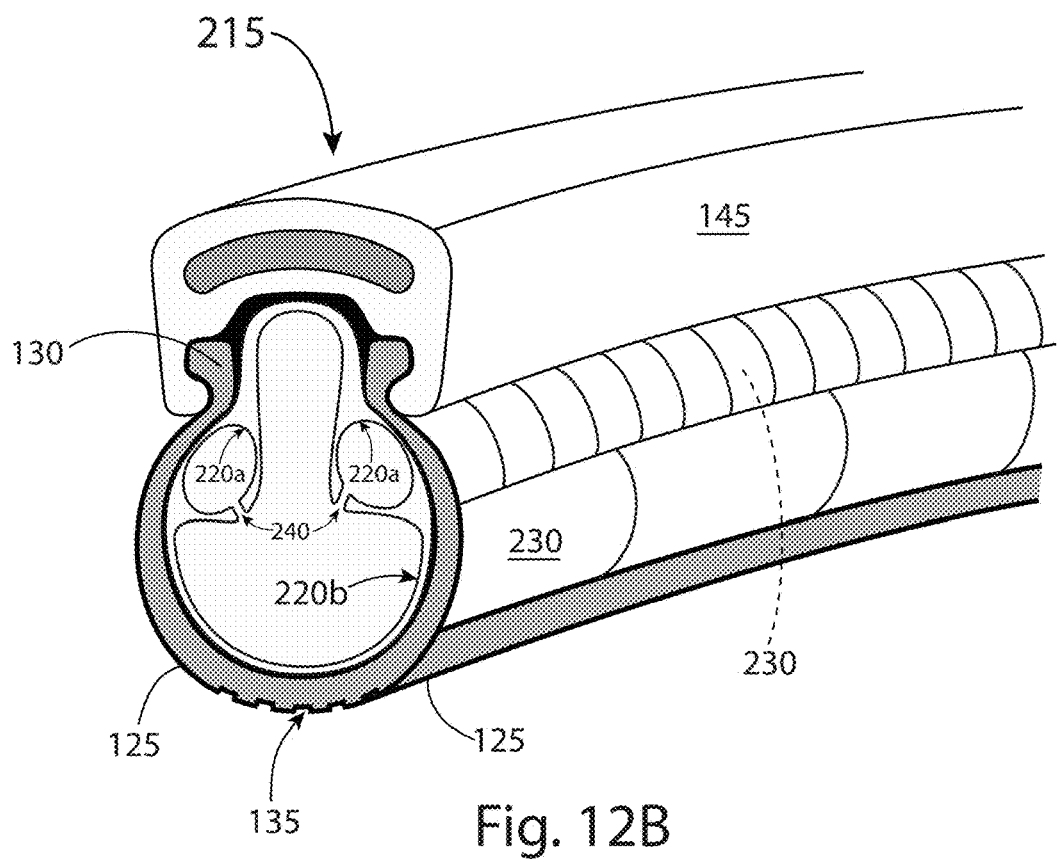
Figure 12C:
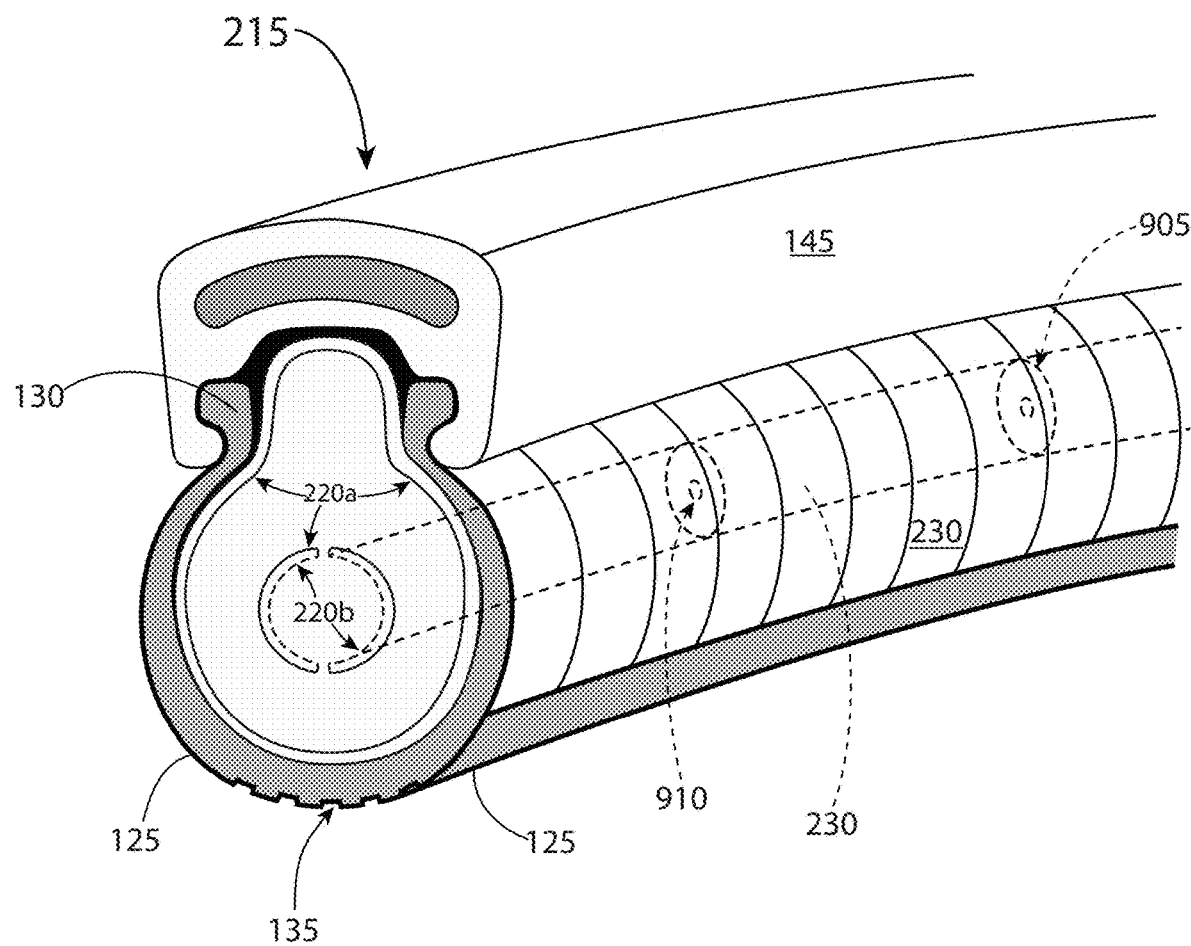

FIGS. 12A-12C show various configuration of the segmented inner tube 220 having localized protection for pinch flats against the rim 145, according to several illustrated embodiments. These embodiments comprise multiple layers of the plurality of bladders 230, where each layer may have its own size of bladders 230. Furthermore, the layer proximate the rim 145 may include bladders 230 of sufficiently small volume and interconnection size to substantially prevent airflow escape during impact and thus cause a spike in air pressure during impact or compression.

FIGS. 12A-12C deploy multiple air bladders of different shapes and sizes strategically localized at the pinch points with the rim 145 to provide better protection against pinching the segmented inner tube 220 between the rim 145 and the surface 155. In particular, FIGS. 12A-12B illustrate the segmented inner tube 220 comprising the inner tube 220a with small bladders 230 strategically disposed along and adjacent to the rim 145 of the bicycle tire 215. The segmented inner tube 220 further comprises the inner tube 220b having larger bladders 230 disposed along the inner face of the tire carcass 125. The FIG. 12C embodiment illustrates the segmented inner tube 220 comprising the inner tube 220b having the large bladders 230 nested within the inner tube 220a having the small bladders 230. In some embodiments, the inner tubes 220a,b are a single unitary inner tube that are pneumatically coupled such that both are filled via the single air valve 235.

The small bladders 230 of the inner tube 220a may have small interconnections 240 therebetween, while the larger bladders 230 of the inner tube 220b may have larger interconnections 240 therebetween. Regardless of bladder 230 or interconnection 240 sizes, both the inner tubes 220a, 220b may be at the same air pressure. However, depending on the size of the bladder 230, the bladders 230 may bleed out air differently.

For example, in response to impact, the larger bladders 230 of the inner tube 220b emits air quickly to give a softer ride of the bicycle tire 215 and thus substantially eliminates bumps due to the road surface 155. However, for an extreme bump in the road surface 155, such as an impediment 110, if the carcass 125 attempts to compress the inner tube 220b bladder 230 against the rim 145, the small inner tube 220a bladders 230 increase air pressure quickly in response to minimal compression of the small bladder 230 and thereby prevent the pinch against the rim 145. As such, the FIG. 12A-12C embodiments reduce the chance of the carcass 125 impacting the bladder 230 (e.g., rubber on rubber) against the rim 145 (e.g., metal rim).

In other words, the large inner tube 220b bladder 230 provides the initial localized reactive force $F_R$ or pressure response to the resistant force $R_F$ (or impact) at the contact patch 160. However, if that reactive force $F_R$ (i.e., pressure response) from the larger inner tube 220b bladder 230 is insufficient, the smaller inner tube 220a bladders 230 serve to provide a backup reactive force $F_R$ (i.e., pressure response). Because the small inner tube 220a bladders 230 have small air volume and small interconnections 240 (e.g., orifice), these small inner tube 220a bladders 230 have a fast ramp-up of pressure. Consequently, for example, the resistant force $R_F$ (i.e., impact force) at the contact patch 160 necessary to cause pinching of the inner tube 220*a* may be twice an amount of resistant force $R_F$ (i.e., impact force) necessary to cause pinching of the inner tube 220*b* against the rim 145 when the small inner tube 220*a* bladders 230 are absent.

It will be appreciated by those of ordinary skill in the art that the inner tubes 220*a*, 220*b* may include various features from the embodiments described above. For example, the plurality of bladders 230 may be formed by having a plurality of dividers 905 (e.g., rubber walls) disposed within the inner tubes 220*a*, 220*b* to create multiple chambers of air pressure at a same pressure. Each of the dividers 905 may include a hole or orifice 910 disposed therein to control airflow between the bladders 230. Additionally, both the inner tubes 220*a*. 220*b* may be interconnected such that a single fill point may inflate all the plurality of bladders 230 within both the inner tubes 220*a*, 220*b*.

Figures 13A, 13B:
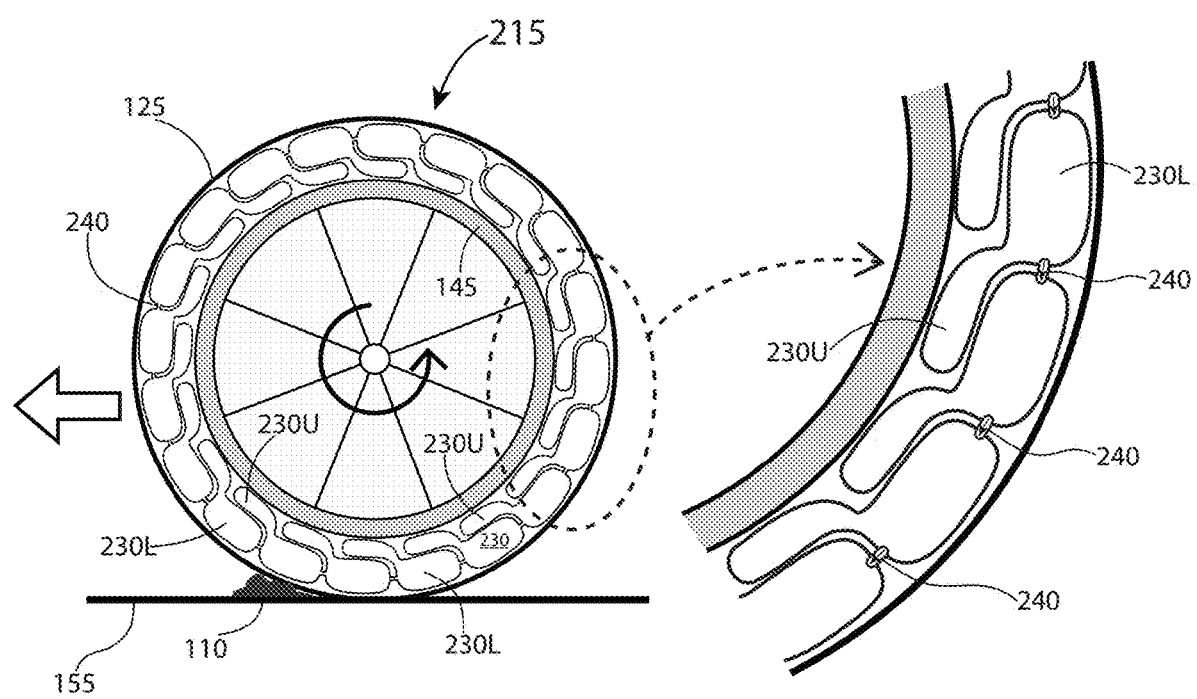
FIG. 13A is a schematic illustration of the bicycle tire comprising the segmented inner tube where each of the plurality of bladders is strategically shaped to comprise a lower portion and an upper portion, according to one embodiment.
FIG. 13B is a schematic illustration of a portion of the bicycle tire of FIG. 13A comprising the segmented inner tube, where the interconnections include one-way valves, according to one embodiment.

FIG. 13A shows a schematic illustration of the bicycle tire 215 comprising the segmented inner tube 220 where each of the plurality of bladders 230 is strategically shaped to comprise a lower portion 230L and an upper portion 230U, according to one illustrated embodiment. The upper portion 230U may be disposed above the lower portion 230L of a subsequent one of the plurality of bladders 230, wherein the subsequent one is positioned along an opposite rotational direction of the inner tube 220.

As discussed above, in response to impact at the contact patch 160, the impacted bladder 230' achieves an abrupt increase in pressure. Because the air pressure in a single bladder is uniformly distributed within that bladder, a pressure at one location within a bladder will be the same at any other location within that same bladder. As such, the pressure increase at the lower portion 230L of the impacted bladder 230' causes a pressure increase in an upper portion 230U of the impacted bladder 230', where the upper portion 230U is disposed above the subsequent bladder 230 that is impacted or compressed next. This configuration allows the impacted bladder 230' to effectively prepare the subsequent bladder 230 for future impact or compression before the actual impact occurs. In other words, a moment just prior to impact of the subsequent bladder 230, the upper portion 230U of the previously impacted bladder 230' is at a higher pressure than the lower portion 230L of that subsequent bladder 230. As such, the upper portion 230U of the previously impacted bladder 230' serves as localized additional support against pinching the rim 145.

Alternatively and/or additionally, as illustrated in FIG. 13B, the interconnections 240 may comprise a one-way valve that will allow air leakage from each impacted bladder 230' to enter into the subsequent bladder 230 to be impacted or compressed. Ultimately, the pre-inflation of the subsequently impacted bladder 230 serves to temporarily create a contact patch 160 area that simulates a larger radius bicycle wheel because it creates more volume to be compressed. Of course, simulating a larger wheel, in turn, may increase the ease of rolling the tire 215 along the surface 155 or impediment 110.

Figure 14A:
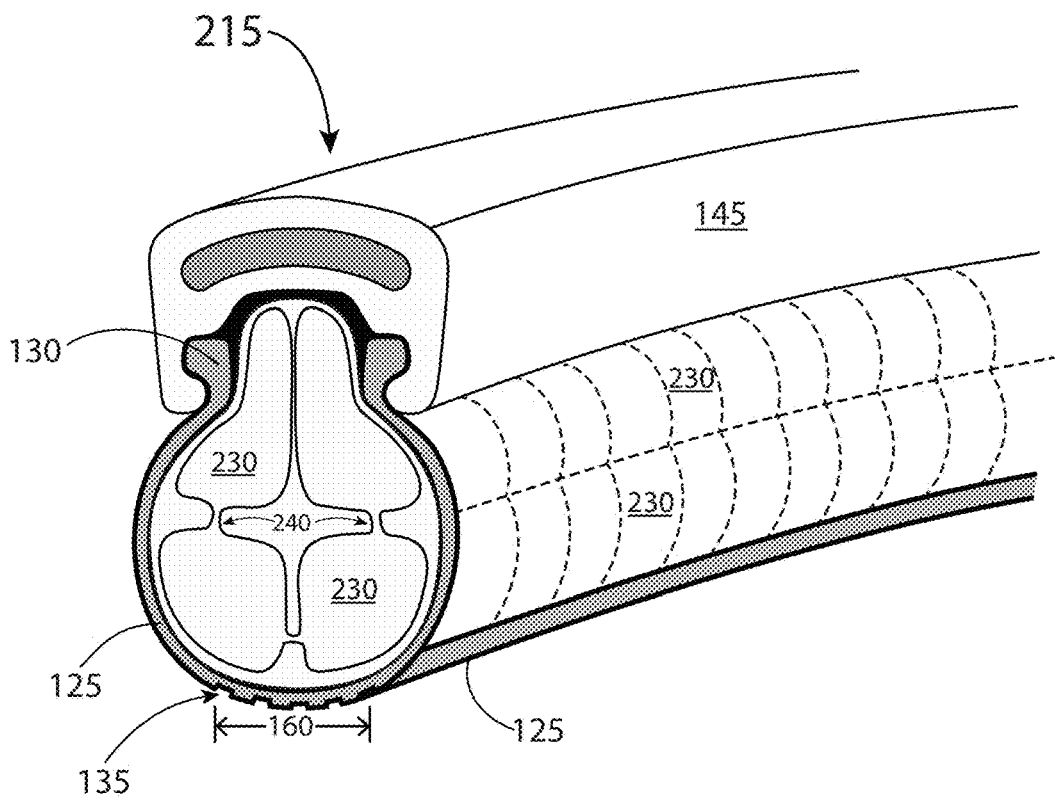
FIG. 14A-14B are schematic illustrations of a segmented inner tube configuration that allows for an inflated tire to take a first shape (FIG. 14A) when not supporting a load and a second shape (FIG. 14B) when supporting the load, according to one embodiment.
Figure 14B:
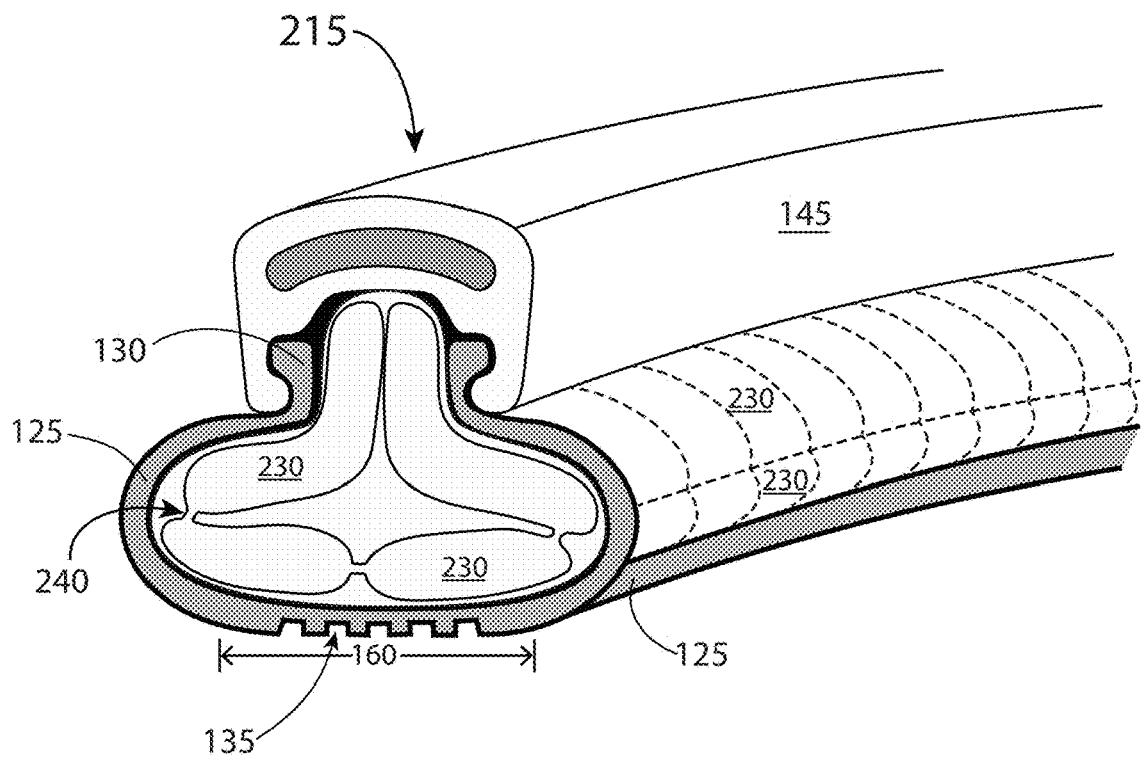

FIGS. 14A-14B show schematic 3D illustrations of a portion of the tire 215 and embedded segmented inner tube 220, according to another illustrated embodiment.

As discussed above, the tire carcass 125 typically obtains its inflated shape by the plurality of bladders 230. The plurality of bladder 230 swell to a maximum size allowed by the carcass 125.

FIGS. 14A-14B illustrate a configuration that allows for an inflated tire 215 to take a first shape (FIG. 14A) when not supporting a load and a second shape (FIG. 14B) when it is supporting a load, according to one illustrated embodiment.

For example, end-to-end linked bladders 230 may be arranged in a zig-zag pattern which can be shaped to inflate into an abrupt U-shaped cross-section. It should be noted that regardless of the configuration of the plurality of bladders 230 and true for all embodiments described herein, the inner tube 230 may be inflated via the single valve 235 common to all the plurality of bladders 230. The inflation of the plurality of bladders 230 via the common valve 235 is facilitated by the interconnections 240. The bladders 230 may be in various configurations with the interconnections 240 therebetween to allow for controlled airflow between the bladders 230. Of course, the interconnections 240 may comprise any form that allows for controlled airflow such that: (i) the impacted bladder 230' obtains increased pressure (and thus increased reactive force $F_R$) to prevent pinch flats; and (ii) the punctured bladder 230" is effectively sealed off from the remaining bladders 230 in the tire 215.

A portion of the tire 215 that carries the load of the bicycle 205 causes the U-shaped cross-section design of the bladders 230 to flatten into a wide contact patch 160. Because of the wide contact patch 160 transformation at points of load bearing, a small bicycle tire 215 may achieve pinch flat prevention efficacy comparable to a large tire 215.

Consequently, portions of the tire 215 that are above the surface 155 achieve a tall profile, while portions of the tire 215 impacting the ground and thus carrying the bicycle weight have a flat profile. This dynamic profile characteristic has an aerodynamic advantage as the bicycle tire 215 traverses the air, while simultaneously maintaining pinch flat prevention characteristics at portions of the tire 215 contacting the surface 155 and/or the impediment 110.

Having described some embodiments of the invention, additional embodiments will become apparent to those skilled in the art to which it pertains. Specifically, although reference was made to a bicycle and bicycle tires throughout the specification and drawings, it will be appreciated that the segmented inner tube embodiments are also relevant for motor vehicles, air planes, and industrial equipment to name a few. The embodiment of a bicycle wheel was described merely to readily convey various aspects of the segmented inner tube but was not intended to limit the segmented inner tube to a bicycle. For example, the segmented inner tube may be advantageous to any wheel that has a flexible external material with a rigid core element and a gap therebetween.

Additionally, although the tire carcass was described as a rubber tire, the segmented inner tube may be enclosed by a tire carcass made from any type of material known in the art. Furthermore, all the embodiments of the segmented inner tube described and illustrated herein are inflatable via a single fill valve. This allows for all the plurality of bladders or chambers to be pneumatically filled without having to unmount the tire carcass and individual inflate each one of the plurality of bladders.

Rolling resistance used herein refers to the force needed to deform or compress the tire and the energy needed to flex it a given amount. Typically, energy will be lost at the contact patch deformation due to the rolling resistance.

Resistant force used herein refers to a force acting against a surface of the tire carcass which causes flattening of the tire and ultimately formation of a contact patch with a surface. The resistant force may, for example, be equal to the bicycle load.

Reactive force used herein refers to a force due to an internal pressure within an impacted bladder. The internal pressure may be substantially higher than the defined pressure of segmented inner tube, and serves as a pressure response or reactive force to counter the resistant force. The segmented inner tube design allows for a localized spike in air pressure within the impacted bladder due to the airflow characteristics of the interconnections described in detail above.

"Interconnections" and "interconnects" are interchangeably referenced throughout the application.

Although aspects of the segmented inner tube have been described and illustrated in terms of airflow within the plurality of bladders to inflate the segmented inner tube, embodiments of the segmented inner tube and its various applications are not limited to air. Embodiments are also applicable to gas, vapor, liquid, or any other type of material in any shape or form that can achieve inflation of the segmented inner tube.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

What is claimed is:

1. An apparatus, comprising:
    an inner tube comprising cinched portions at a plurality of locations along the inner tube, the cinched portions having a hollow core to form a plurality of passageways interconnecting a plurality of bladders in series, wherein the plurality of passageways have a defined size such that, responsive to impact of a first one of the plurality of bladders, air pressure is generated to prevent the first one of the plurality of bladders from compressing against itself, wherein the plurality of passageways are devoid of protrusions into the plurality of bladders;
    a tire carcass which encapsulates the plurality of bladders of the inner tube, the tire carcass solely inflatable via the plurality of bladders; and
    a single valve coupled to the inner tube, the single valve operable to allow introduction of air into the plurality of bladders through the plurality of passageways and inflation of the tire carcass responsive to the introduction of air into the plurality of bladders,
    wherein each of the plurality of bladders are shaped to comprise:
    a lower portion; and
    an upper portion, the upper portion disposed on the lower portion of a subsequent one of the plurality of bladders, wherein the subsequent one is positioned along an opposite rotational direction of the inner tube.

2. The apparatus of claim 1 wherein the plurality of passageways are configured to allow airflow between the adjacent ones of the plurality of bladders in response to a substantially small air pressure difference between the adjacent bladders.

3. The apparatus of claim 2 wherein the plurality of passageways are configured to occlude the airflow between the adjacent bladders in response to the air pressure difference between the adjacent bladders being substantially high.

4. The apparatus of claim 2 wherein the plurality of passageways are configured to restrict airflow between the adjacent bladders in response to impact of at least one of the adjacent bladders.

5. The apparatus of claim 4 wherein in response to the impact of the at least one of the adjacent bladders, the respective passageways of the impacted at least one of the adjacent bladders substantially prevents air from escaping the impacted at least one of the adjacent bladders.

6. The apparatus of claim 5 wherein the impacted at least one of the adjacent bladders has an air pressure that is substantially higher than an air pressure of non-impacted ones of the plurality of bladders.

7. The apparatus of claim 6 wherein the impacted at least one of the adjacent bladders is compressed in response to the impact.

8. The apparatus of claim 1 wherein the single valve is a fill valve common to all the plurality of bladders.

9. The apparatus of claim 1 wherein at least one of the plurality of bladders includes an impacted bladder, the impacted bladder is one of the plurality of bladders that receives an impact force, wherein the impacted bladder comprises an increased pressure in both the lower and upper portions of the impacted bladder.

10. The apparatus of claim 9 wherein at least one of the plurality of bladders includes a subsequent bladder, the subsequent bladder is located subsequent the impacted bladder along the opposite rotational direction of the inner tube, the lower portion of the subsequent bladder having a lower pressure than the upper portion of the impacted bladder.

11. A tire assembly, comprising:
    an inner tube comprising cinched portions at a plurality of locations along the inner tube, the cinched portions having a hollow core to form a plurality of passageways interconnecting a plurality of bladders in series, the plurality of bladders configured to be pneumatically inflated, the plurality of passageways have a defined size to occlude pneumatic flow between adjacent ones of the plurality of bladders in response to a substantial increase in the pneumatic flow between the adjacent ones of the plurality of bladders, wherein the plurality of passageways are devoid of protrusions into the plurality of bladders;
    a tire carcass having beads along its edges, the tire carcass encases the inner tube and is solely inflatable via the plurality of bladders;
    a single valve coupled to the inner tube to allow pneumatic inflation of the plurality of bladders through the plurality of passageways and inflation of the tire carcass responsive to the pneumatic inflation of the plurality of bladders;
    a rim having flanges wherein the beads interlock with the flanges to secure the tire carcass to the rim, the inner tube enclosed by the rim to support the tire carcass; and
    ancillary bladders to fill space gaps between successive ones of the plurality of bladders, wherein:
    the ancillary bladders are connected to at least one of the plurality of bladders or the plurality of passageways, and the single valve serves as a single connection point to the successive ones of the plurality of bladders.

12. The tire assembly of claim 11 wherein at least one of the plurality of bladders includes an impacted bladder, the impacted bladder is one of the plurality of bladders that receives an impact force, wherein the impacted bladder attains an increased pressure in response to the impact force.

13. The tire assembly of claim 12 wherein the increased pressure within the impacted bladder is at least twice a pressure within the impacted bladder prior to the impact.

14. The tire assembly of claim 13 wherein a contact patch area of the tire carcass compressing against the impacted bladder is at least twice the contact patch area of the tire carcass prior to the impact force.

15. The tire assembly of claim 12 wherein the increased pressure is isolated within the impacted bladder, the increased pressure prevents the bladder from being pinched against the rim.

16. The tire assembly of claim 12 wherein in response to the impact force against the impacted bladder, the respective passageways are operable to occlude pneumatic flow between the impacted bladder and adjacent ones of the plurality of bladders.

17. The tire assembly of claim 12 wherein the passageways are operable to occlude pneumatic flow in response to the pneumatic flow between the impacted bladder and the adjacent ones of the plurality of bladders being above a defined threshold.

18. The tire assembly of claim 12 wherein the passageways are operable to occlude pneumatic flow in response to the pneumatic pressure differential between the impacted bladder and the adjacent ones of the plurality of bladders being above a defined threshold.

19. The tire assembly of claim 12 wherein the impact force is initiated in response to at least one of a load spike carried by the tire assembly and the tire carcass impacting an impediment.

20. The tire assembly of claim 19 wherein the impediment takes a form of at least one of a rock, hole, curb, branch, and uneven surface.

21. The tire assembly of claim 11 wherein the plurality of bladders are pneumatically inflated with at least one of air, gas, and liquid.

* * * * *